US009306698B2

(12) United States Patent
Chen et al.

(10) Patent No.: US 9,306,698 B2
(45) Date of Patent: Apr. 5, 2016

(54) METHODS AND APPARATUSES FOR DWDM MULTI-MODE SWITCHING ROUTER AND DYNAMIC MULTI-MODE CONFIGURATION AND RECONFIGURATION

(75) Inventors: Yuhua Chen, Houston, TX (US); Wenjing Tang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 711 days.

(21) Appl. No.: 13/599,912

(22) Filed: Aug. 30, 2012

(65) Prior Publication Data

US 2013/0051798 A1 Feb. 28, 2013

Related U.S. Application Data

(60) Provisional application No. 61/528,927, filed on Aug. 30, 2011.

(51) Int. Cl.
*H04J 14/00* (2006.01)
*H04J 14/02* (2006.01)
*H04Q 11/00* (2006.01)

(52) U.S. Cl.
CPC ......... *H04J 14/0212* (2013.01); *H04J 14/0256* (2013.01); *H04J 14/0257* (2013.01); *H04Q 11/0005* (2013.01); *H04Q 2011/002* (2013.01); *H04Q 2011/0016* (2013.01); *H04Q 2011/0039* (2013.01)

(58) Field of Classification Search
CPC ........... H04B 10/0267; H04B 10/0269; H04B 10/0272; H04B 10/0273; H04J 14/02; H04J 14/06; H04Q 11/0005; H04Q 11/0062; H04Q 11/0066

USPC .......... 398/45, 46, 47, 48, 49, 50, 51, 52, 53, 398/54, 56, 57, 79, 33, 25; 385/24, 16, 17, 385/18; 370/252, 351, 389, 465, 401, 392
See application file for complete search history.

(56) References Cited

U.S. PATENT DOCUMENTS

| | | | |
|---|---|---|---|
| 6,519,062 B1 * | 2/2003 | Yoo | 398/49 |
| 6,647,208 B1 * | 11/2003 | Kirby | 398/45 |
| 7,747,168 B2 | 6/2010 | Ryu | |
| 8,731,401 B2 * | 5/2014 | Chen et al. | 398/46 |
| 2005/0047392 A1 | 3/2005 | Ashwood Smith | |
| 2008/0025288 A1 | 1/2008 | Benner et al. | |
| 2013/0094856 A1 | 4/2013 | Chen | |

OTHER PUBLICATIONS

Chen et al. 'Reconfigurable Asymmetric Optical Burst Switching for Concurrent DWDM Multimode Switching: Architecture and Research Directions'. In: IEEE communication magazine, May 2010.
Shete et al. 'Cost Analysis of DWDM Multi-Mode Switching Router'. In: IEEE International Conference on High Performance Switching and Routing, 2010.
Xiong et al., "Control Architecture in Optical Burst-Switched WDM Networks," IEEE Journal on Selected Areas in Communications, vol. 18, No. 10, Oct. 2000.
Chen et al., "Optimal Burst Scheduling in Optical Burst Switched Networks," Journal of Lightwave Technology, vol. 25, No. 8, Aug. 2007.

\* cited by examiner

*Primary Examiner* — Hanh Phan
(74) *Attorney, Agent, or Firm* — Winstead PC

(57) ABSTRACT

A multi-mode configuration module for managing switching for an EPS, OCS, and OCS mode is provided. The multi-mode configuration module may include a multi-mode configuration processor, wherein said multi-mode configuration processor receives configuration information for an EPS, OCS, or OBS mode. The module may also provide an optical configuration processor coupled to said multi-mode configuration processor, wherein said optical configuration processor manages wavelength routing of an optical switching fabric; and an electronic configuration processor coupled to said multi-mode configuration processor, wherein said electronic configuration processor manages routing of an electronic switching fabric.

22 Claims, 27 Drawing Sheets

METHODS AND APPARATUSES FOR DWDM MULTI-MODE SWITCHING ROUTER AND DYNAMIC MULTI-MODE CONFIGURATION AND RECONFIGURATION

RELATED APPLICATIONS

This application claims the benefit of U.S. Provisional Patent Application No. 61/528,927, filed on Aug. 30, 2011, which is incorporated herein by reference.

STATEMENT REGARDING FEDERALLY SPONSORED RESEARCH

This invention was made with government support under Grant Nos. CNS-0708613, CNS-0923481 and ECCS-0926006 awarded by the National Science Foundation. The government has certain rights in the invention.

REFERENCE TO A SEQUENCE LISTING

Not Applicable.

FIELD OF THE INVENTION

This invention relates to providing multi-mode switching in dense wavelength division multiplexing (DWDM) networks. More particularly, to dynamic configuration and reconfiguration in DWDM networks.

BACKGROUND OF INVENTION

Dense Wavelength Division Multiplexing (DWDM) technology greatly expands networks' capacity over existing network infrastructures by the simultaneous transmission of hundreds of wavelengths over a single fiber. DWDM transmission has been widely deployed in long haul service provider networks, and is increasingly being deployed in metro service provider networks and for enterprise data center connectivity applications. While DWDM is universally used in transmission, different switching technologies can be used to direct input data to outputs at router nodes. Current switching technologies fall into either electronic switching or optical switching technologies, based on how data is processed in the router. Electronic switching technology, also known as electronic packet switching (EPS), converts DWDM optical signals to electronic signals, and processes data (usually in the form of packets) electronically. However, as the number of DWDM channels increases, the optical/electrical/optical (O/E/O) conversion required by electronic switching significantly adds cost to the overall system cost. For example, while it is technologically feasible to carry 512 wavelengths in a single optical fiber, it requires 512 O/E/O pairs in EPS routers to just terminate a single DWDM link. Optical switching technologies, on the other hand, allow DWDM channels to pass the router node optically, which greatly reduces the cost of deploying DWDM channels over existing network infrastructure. Optical switching can be further divided into three technologies: Optical Circuit Switching (OCS), Optical Packet Switching (OPS), and Optical Burst Switching (OBS). Unfortunately, there is no single switching technology that can cost-effectively scale with the number of DWDM channels while meeting the diverse needs of heterogeneous applications.

From the application's perspective, Internet traffic is inherently heterogeneous, embracing all data generated by applications that differ greatly in nature (e.g., VoIP, Video-on-Demand (VoD), IPTV, 3G/WiMax, Virtual-Private-Network (VPN), 10 Gigabit Ethernet). No single switching technology (EPS, OCS or OBS) appears to be suitable for a variety of different applications. Although optical switching technologies have advantages in scaling up DWDM systems, neither OCS nor OBS can switch at the packet level. For example, applications transporting short, latency sensitive messages desires fine packet level granularity. Even between the two optical switching technologies, OCS and OBS, it is hard to declare a winner for all types of applications. While it is clear that OBS performs well for most of bursty Internet traffic, OCS is more suitable for applications that require sustained, long-term full channel bandwidth (i.e. 10 Gb/s and above). OCS is also a better fit for mission critical applications which cannot tolerate any data loss or variable delay. One can conceivably build separate networks using different switching technologies to meet respective needs of applications. However, for some applications, this implies a higher capital investment, more management issues, and less flexibility. Unfortunately, there is no single type of network that can best fit the need for different applications due to the varying characteristics of different types of messages within the application. Although attempts have been made to support specific applications in the network, none of them address the DWDM channel scaling issue.

The DWDM multi-mode switching methods and apparatuses discussed herein overcomes the above-mentioned limitations by supporting multiple switching technologies (EPS, OBS and OCS) in DWDM-based communication networks. The methods and apparatuses discussed provide for dynamically configuring and reconfiguring multi-mode switching routers.

SUMMARY OF THE INVENTION

In accordance with the present invention, therein are disclosed methods to support scheduling and configuration of multi-mode switching in DWDM routers.

In one implementation, a multi-mode configuration module for managing switching for an EPS, OCS, and OCS mode is provided. The multi-mode configuration module may include a multi-mode configuration processor, wherein said multi-mode configuration processor receives configuration information for an EPS, OCS, or OBS mode. The module may also provide an optical configuration processor coupled to said multi-mode configuration processor, wherein said optical configuration processor manages wavelength routing of an optical switching fabric; and an electronic configuration processor coupled to said multi-mode configuration processor, wherein said electronic configuration processor manages routing of an electronic switching fabric.

In another implementation, an integrated multi-mode scheduling apparatus provides an OBS burst scheduler receiving OBS control packets, wherein when said OBS control packets are received, an available OBS optical wavelength is determined and allocated for an OBS mode; an OCS connection setup/teardown receiving OCS control packets, wherein when said OCS control packets are received, an available OCS optical wavelength is determined and allocated for an OCS mode; and an EPS mode reconfiguration receiving EPS control packets, wherein when said EPS control packets are received, an available EPS optical wavelength is determined and allocated for an EPS mode.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
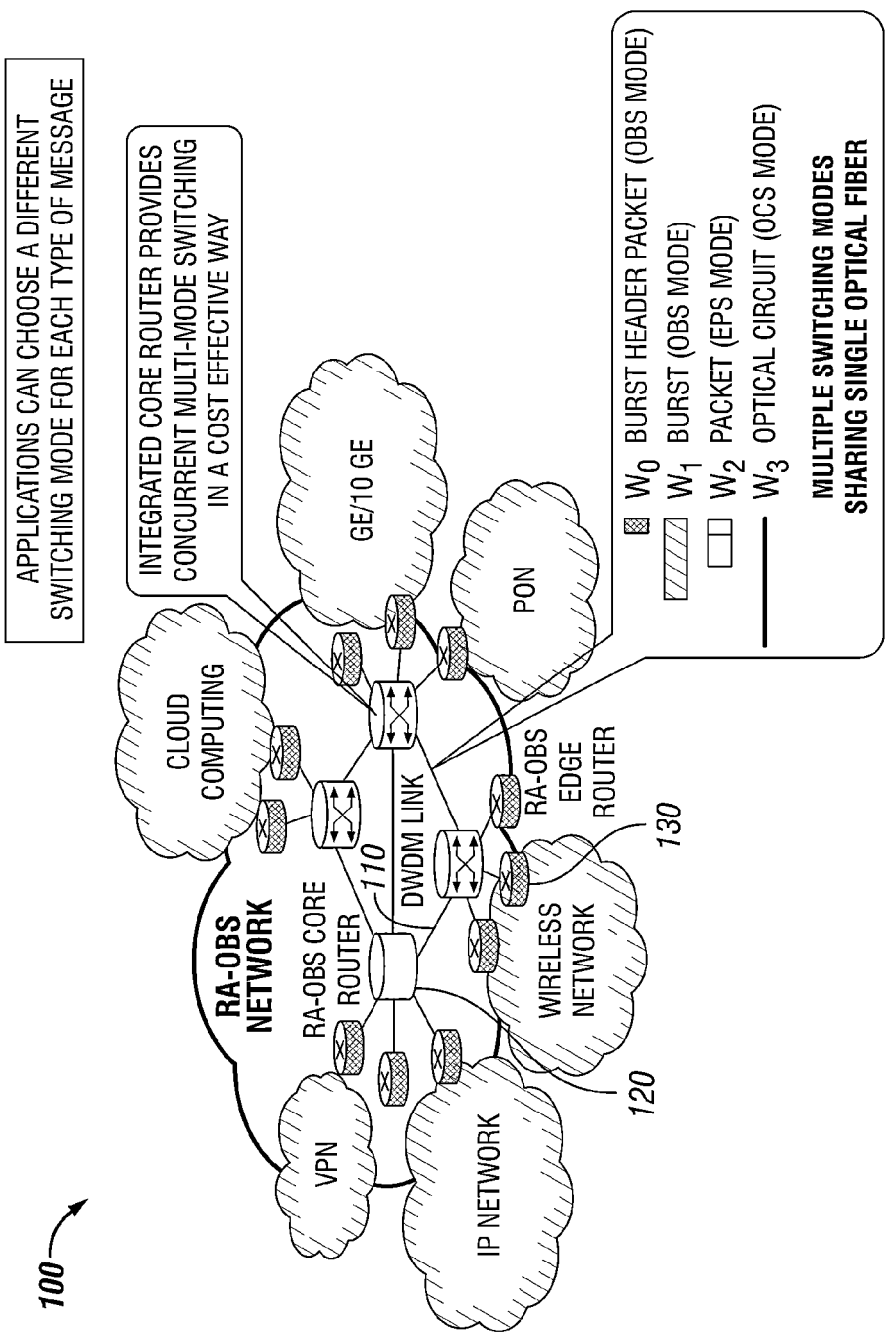
FIG. 1 is an illustrative implementation of a RA-OBS network.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Dense Wavelength Division Multiplexing (DWDM) has dramatically improved bandwidth distance, providing huge reductions in the cost per bit per mile of transmission. DWDM is becoming the universal standard in transmission. Today there are two primary switching technologies, namely, electronic switching and optical switching. These switching technologies are discussed herein.

Electronic Packet Switching (EPS) Technology

Electronic Packet Switching (EPS) converts DWDM signals back to electrical signals and processes data on a packet-by-packet basis. In general, EPS routers can be categorized into Input Queued (IQ) switches, Output Queued (OQ) switches, and Combined Input-Output Queued (CIOQ) switches based on where packets are buffered. In an IQ switch, packets are buffered at input ports and a crossbar switch fabric is used. In a given time slot, an input of an IQ switch can send out at most one packet, and an output can receive at most one packet. In an OQ switch, packet buffers are placed at the output ports. All packets arriving at input ports are immediately transferred to their respective output ports. Unfortunately, an OQ switch requires that the internal switching fabric operates at a speedup of N, where N is the number of ports of the router. Therefore, an OQ switch is not scalable. In a CIOQ switch, packet buffers are placed at both input and output ports. The switching fabric operates with a speedup, which allows up to S packets to be transferred from an input and up to S packets to be received by an output in each time slot.

In an ideal OQ switch, a packet only contends for bandwidth with packets buffered at the same output port. Fair scheduling in the context of a single server has been widely studied. Weighted Fair Queueing (WFQ) and its packetized implementation have been shown to be a good approximation of Generalized Processor Sharing (GPS). Deficit Weighted Round Robin (DWRR) provides a computationally efficient version of WFQ. However, the above results cannot be immediately extended to IQ or CIOQ switches due to scheduling constraints. It has been shown that CIOQ with a speedup of 2 is necessary and sufficient for emulating an OQ switch under various policies such as FIFO, WFQ, DWRR, etc. However, the prevalence of DWDM has enabled transmission rate at 10 Gb/s, 40 Gb/s, and potentially at 160 Gb/s. At these transmission rates, even a CIOQ with a speedup of 2 is not practical due to the high electronic buffer speeds required. Parallel Packet Switch (PPS) uses multiple identical lower-speed packet switches operating independently and in parallel to reduce the buffer bandwidth requirement on individual packet switches. In addition to the electronic buffer speed, the above approaches require a centralized scheduler. Although several scheduling algorithms can provide a guaranteed throughput of 50% to 100%, these centralized scheduler based schemes become impractical as the number of DWDM channels grows, because of their scheduling complexity and/or the speedup of the buffer memory. The load balanced switch avoids the centralized packet scheduler and can support a large number of linecards. Unfortunately, the cost for optical/electrical/optical (O/E/O) conversion in electronic packet switching becomes the limiting factor for scaling to a large number of DWDM channel.

Optical Switching Technologies

Optical Circuit Switching (OCS)

Optical circuit switching is realized in practice in various forms such as Optical Add/Drop Multiplexers (OADMs), Reconfigurable OADMs (ROADMs), and Wavelength Routers. OADMs and ROADMs allow one or more wavelengths to be added or dropped at a node. Wavelengths to be added or dropped are fixed in OADMs and can be reconfigured in ROADMs. However, OADMs or ROADMs can only be used to construct linear or ring network topologies and are not suitable for building mesh network architecture. A wavelength router can switch wavelengths among multiple incoming and outgoing fibers and can be used to build mesh networks. The coarse granularity, however, restricts the wavelength routers to core networks where optical connections are provisioned to last for months or years. Additionally, connections are needed, just to connectedges, which is not scalable to the Internet size. Research in OCS is focused on circuit connection blocking analysis, routing and wavelength assignment (RWA), and traffic grooming. Traffic grooming is a technique that allows lower-speed traffic such as STS-1 (51.94 Mb/s), OC-3, OC-12 and OC-48 to share lightpaths either statically or dynamically. However, as 10 Gigabit Ethernet becomes increasingly popular, benefits of traffic grooming diminish.

Optical Packet Switching (OPS)

Optical packet switching intends to switch packets optically and has the finest granularity among all forms of optical switching. In optical packet switching, the packet payload is buffered optically while the packet header is converted to electronic signals and processed electronically at each node. When two packets contend for an output, one of them needs to be buffered optically. Both factors—storing optical payload during header processing and buffering optical packets for contention resolution—require optical buffers. Unfortunately, current optical buffers do not provide random access. The only way to provide limited delays in the optical domain is through Fiber Delay Lines (FDLs). Time delays to the optical payload are achieved either through the use of FDLs of varying lengths, or through the use of a fiber delay loop where the optical data to be stored circulates through the loop a number of times. The lack of optical random access memory severely degrades the performance of optical packet switching. In addition, implementing FDLs at the scale needed is not practical. For example, a 1 microsecond delay would require over 1000 feet of FDLs. The synchronization between the packet header and its payload is another serious concern in optical packet switching. After the packet header is processed, it is converted to optical signals and needs to be combined with the optical payload. Synchronizing the header and the payload is a challenging task that has not been yet accomplished beyond the research laboratory.

Optical Burst Switching (OBS)

Optical burst switching is an emerging core switching technology that allows variable size data bursts to be transported over DWDM links. In order to reduce the switching overhead at the core nodes, the ingress edge node aggregates packets from a number of sources destined for the same egress node dynamically to form a large data burst. An optical path is created on the fly to allow data bursts to stay in the optical domain and pass through the core routers transparently. This is achieved by launching a burst header on a separate control channel ahead of the data burst and setting up the optical path prior to the arrival of the data burst. Since OBS is a relatively new field, discussion of several important aspects is provided herein.

OBS signaling protocol: The Just-Enough-Time (JET) OBS signaling protocol allows the OBS core routers to use delayed reservations by calculating the projected future burst arrival time and the burst release time using the information carried in the burst header. As a result, the OBS core router can manage the wavelength resources efficiently by reserving the wavelength only for the duration of the burst. While the JET protocol is the prevailing protocol used for OBS, the other notable OBS signal protocol is Just-In-Time (JIT). Compared to JET, JIT reserves the channel bandwidth when a setup message is received, not when the data burst is to arrive, and, therefore, is less efficient in terms of bandwidth usage. It was originally believed that the JIT protocol with instant reservations would be easier to implement than the JET protocol with delayed reservations. However, it has been demonstrated that several channel scheduling algorithms based on the JET protocols are very efficient.

Burst Assembly: The OBS ingress edge router aggregates packets into bursts before forwarding them to the core network. This process is called burst assembly. Bursts are assembled based on the destination edge routers. A burst is formed when either of the following conditions is met: (1) the size of the assembling burst reaches the burst length threshold; or (2) the timer expires. The timeout value restricts the burst assembly latency and is especially useful under light traffic loads. Bursts usually reach the burst length threshold before the timer expires under heavy traffic loads. Although the threshold only or timer only burst assembly policies have been discussed, the mixed burst assembly scheme described above works well under both light and heavy traffic loads without much implement overhead. The mixed burst assembly scheme is considered as the default scheme for OBS. Based on some variations of burst protocols, burst connections are established by sending an explicit burst setup request, and are torn down by sending an explicit burst teardown request.

Burst Scheduling: In OBS networks, the core routers set up optical paths on the fly, based on the information carried in the burst headers. This requires an online burst scheduling algorithm that can support a large number of wavelength channels. The major burst scheduling algorithms are discussed below. Horizon scheduling maintains a single status for each wavelength and is efficient to implement, but it suffers from low link utilization. The LAUC-VF (latest available unscheduled channel with void filling) keeps track of the voids (gaps) on each wavelength and has high link utilization. The complexity of LAUC-VF is $O(m)$, where m is the total number of voids. Min-SV (Minimum Starting Void) is a more efficient implementation of LAUC-VF which uses a geometric approach by organizing the voids into a balanced binary search tree. The complexity of Min-SV algorithm is $O(\log m)$. However, Min-SV has large memory access overhead for each burst scheduling request. It turns out that the voids are caused by the variable offset times between the burst headers and bursts.

Supporting Quality-of-service (QoS) in OBS: The offset-based QoS scheme assigns a larger offset time to higher priority bursts. However, offset-based QoS favors shorter length bursts and has longer delay for higher priority bursts. Intentional Burst Dropping and Burst Early Dropping intentionally drop low priority bursts, therefore, suffer from high overall burst loss probability. Wavelength grouping guarantees worst-case burst loss probability for each service class at the expense of elevated overall burst loss probability by restricting the use of wavelengths for each priority class. The Look-Ahead Window (LaW) resolves burst contention by constructing a window of W time units and makes collective decisions on burst dropping. LaW only drops a burst when contention is identified. However, the algorithm has high computational complexity. The Contour-based Priority (CBP) algorithm achieves O(1) runtime complexity yet inherits the optimal burst scheduling properties in, and is suitable for practical realization in OBS networks.

To summarize, OBS provides an effective means to realize dynamic DWDM networks. However, it still has coarse granularity compared to packet switching as a burst is a collection of hundreds or thousands of packets.

Methods and apparatuses for dynamic wavelength configuration/reconfiguration in optical networks are discussed herein. These methods and apparatuses may provide dynamic configuration/reconfiguration of multi-mode switching routers. Further, the methods and apparatus may provide methods of constructing an optical router that supports multi-mode switching.

These methods and apparatuses allow dynamic configuration/reconfiguration into any of three switching modes: EPS, OCS, and OBS modes. The methods and apparatuses minimize the drawbacks of using only one switching mode. Various embodiments that disclose the basic operations of the methods and apparatus are explained as follows.

While the packet switching technologies discussed herein identify several methods, processes, and/or schemes that may be utilized, they are provided for illustrative purposes. Thus, it is noted that the traffic management methods and apparatuses discussed herein are in no way limited to the examples methods, processes, and/or schemes discussed herein. It will be recognized by one of ordinary skill in the art that any suitable methods, processes, and/or schemes known in the art maybe utilized with the dynamic configuration/reconfiguration methods and apparatuses discussed herein.

The Multi-Mode Switching DWDM network architecture may provide a set of multi-mode switching edge routers and core routers connected by DWDM links. Each wavelength in a DWDM link can be individually configured in the electronic packet switching (EPS), optical circuit switching (OCS) or optical burst switching (OBS) mode. The most suitable switching mode can be used to transport individual applications, as well as individual message types within an application. More importantly, the architecture provides a cost effective way to scale the number of DWDM channels by maintaining a relatively small number of costly electronic switching ports. In addition, legacy optical switching networks can interface with the proposed DWDM network directly by setting the wavelengths in the fiber to be in the OCS mode.

Concurrent DWDM Multi-Mode Switching: A multi-mode router can be configured such that all three modes can be concurrently supported in the multi-mode switching core router. For example, four wavelengths $w_0$-$w_3$ can be configured in different modes in the same incoming optical fiber connected to Port 1 of the core router. Wavelength $w_0$ is the control wavelength in the OBS mode to carry burst header packets. Wavelength $w_1$ is the data wavelength in the OBS mode to carry data bursts. Wavelength $w_2$ is set in the EPS mode and is used to carry packets which are switched electronically. Wavelength $w_3$ is in the OCS mode, and any data sent on that wavelength will follow the pre-established lightpath in the optical switching fabric to the desired output. Each of the four wavelengths is switched based the operation of the particular switching mode described above. The outgoing wavelengths may be combined at the output onto the optical fiber. Additional discussion of concurrent DWDM Multi-Mode switching and traffic management is provided in U.S. application Ser. No. 13/325,544 filed on Dec. 14, 2011, and U.S. application Ser. No. 13/434,597 filed on Mar. 29, 2012, which are incorporated by reference herein.

Reconfigurable Asymmetric Optical Burst Switching (RA-OBS) networks discussed herein allow multiple switching modes, such as electronic packet switching (EPS), optical burst switching (OBS), and optical circuit switching (OCS), to be supported in the same network and on the same router platform concurrently. Existing approaches for supporting both electronic and optical switching either only provide grooming functions as lower speed traffic is added or dropped at the router nodes, or are designed for routers with a relatively small number of DWDM channels. In comparison, the RA-OBS multi-mode switching architecture dynamically shares a set of electronic switching ports among different switching modes through the core optical switching fabric. Therefore, it allows for cost effective expansion of the network with a large number DWDM channels by keeping a relatively small number of expensive electronic switching ports.

In the multi-mode switching routers, wavelengths channels in the optical fiber are shared among three different switching modes: EPS, OBS and OCS. DWDM channel scheduling by itself is a challenging problem, due to the total number of DWDM channels that need to scheduled, and ultra high speed of each individual channels. An integrated scheduling scheme may provide a more robust and more cost effective solution.

Optical burst switching may serve as a middle ground in the RA-OBS multi-mode switching architecture. The problem of allocating a channel for the EPS or the OCS mode can be converted to a special case in the OBS channel scheduling problem; therefore, can be solved by the integrated scheduling approach described herein. The systems and methods discussed herein can also be applied to the universal signaling, switching and reservation framework.

FIG. 1 is an illustrative implementation of a reconfigurable asymmetric optical burst switching (RA-OBS) network 100 providing a set of RA-OBS edge router(s) 130 and RA-OBS core router(s) 120 connected by DWDM link(s) 110. RA-OBS edge routers 130 may interface with various networks including, but not limited to, virtual private networks (VPN), IP networks, wireless networks, passive optical networks (PON), Gigabit Ethernet (GE)/10 GE, cloud computing, or the like. In the RA-OBS network 100, each wavelength in a DWDM link can be individually configured for EPS, OCS or OBS modes. RA-OBS core router 120 switches data based on the mode configured for a given wavelength, and routes data accordingly. More specifically, a wavelength configured in the EPS mode is switched electronically on a packet by packet basis by the core router; a wavelength in the OCS mode is switched at the wavelength level using optical circuit switching; and a wavelength in the OBS mode is switched according to optical burst switching protocols. An application can choose a switching mode that is best suited for the characteristics of the entire application or vary switching modes for each message type within the application.

Another embodiment is to implement different adaptive schemes under the current invention to achieve integrated dynamic services. At the multi-mode switching ingress edge router, packets may be received on different line interfaces such as IP, Gigabit Ethernet (GE)/10 GE, etc. and may be classified for processing into a desired mode (EPS, OCS, or OBS modes) by a traffic management module. Classification can be performed at the packet level or based on specific settings such as a particular line interface. Based on the results from the classifier and dynamic traffic management schemes enabled in the dispatcher, the packets or traffic streams will be processed according to one of the following switching modes: (1) EPS mode—Packets sent in the EPS mode are queued and transmitted in the EPS packet processor; (2) OCS mode—Traffic streams in the OCS mode are sent on pre-established lightpaths via the OCS manager; (3) OBS mode—Packets or flows in OBS mode are assembled into bursts based on the destination edge router address and sent according to OBS protocols. The integrated multi-mode traffic management module is responsible for dynamic multi-mode reconfiguration and signaling protocols for individual switching modes. All wavelengths are combined onto the outgoing DWDM link.

The traffic management systems and methods allow dynamic traffic to receive packet level services in any of the three switching modes, the EPS mode, the OCS mode, and the OBS mode, greatly reducing the need for pure EPS mode service, which is relatively expensive due to O/E/O conversion. In one embodiment, the packets are dispatched to one of the three switching modes according to dynamic traffic conditions. As a result, the switching mode for a particular packet is not fixed until the transmission time, which can be in the EPS, OCS or OBS mode. The packets are tagged to be sent in one of the three switching modes after classification.

RA-OBS network 100 has the following characteristics:

Multimodal: The multimodal switching is provided for by the novel systems and methods discussed herein. Each individual DWDM wavelength channel may be allocated for a different switching mode, thereby allowing multiple switching modes to be utilized simultaneously. Each fiber can transmit multiple wavelengths, each utilizing different switching modes, to allow data to be transferred using multiple switching modes.

Reconfigurability: The reconfigurability comes from the fact that each individual DWDM wavelength channel in the systems and methods described herein can be reconfigured to carry traffic in different switching modes. In addition, the number of wavelengths in each fiber used for EPS, OCS and OBS can be dynamically reconfigured based on specific traffic demands.

Asymmetry: The asymmetry is due to the fact that in a two-way communication, different switching modes can be used in different directions to provide the best performance, taking into account the characteristics of the data in each direction. For example, in telesurgery applications, the OBS or OCS mode can be used for transferring medical quality 3D video from the patient site to the remote surgeon site, while using the EPS mode for short robot control messages from the remote surgeon site to the patient site.

Figure 2:
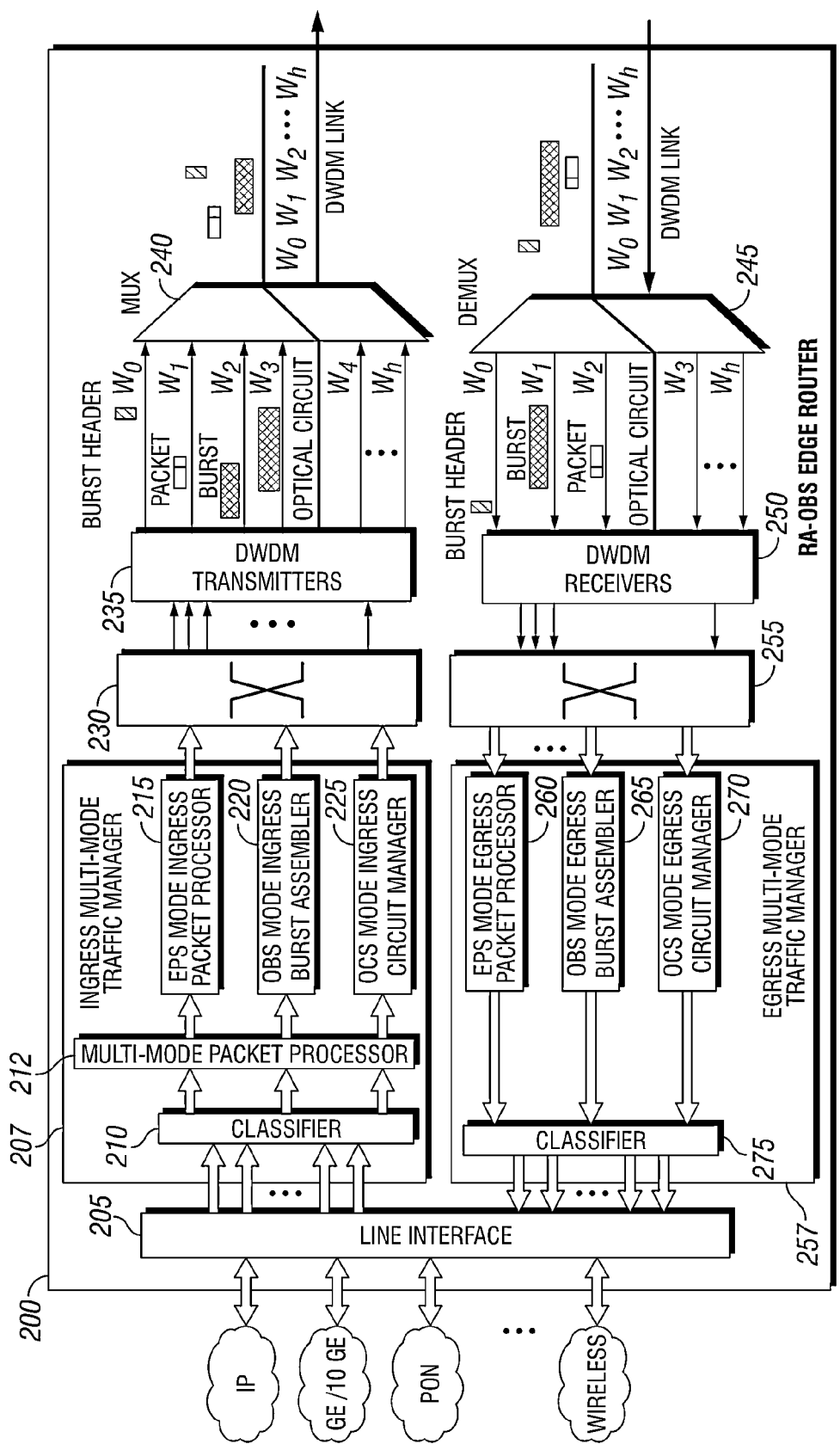
FIG. 2 is an illustrative implementation of a RA-OBS edge router.

FIG. 2 is an illustrative implementation of an architecture for a RA-OBS edge router 200. In the ingress direction, packets may be received from various networks by line interface 205 and are sent to ingress traffic manager 207, which includes classifier 210 processors and dynamic multi-mode packet processor 212 for various switching modes, for classification and packet/data separation according to a switching mode. Classification and packet/data processing can be performed at the packet level or can be based on specific settings. For example, a particular line interface may specifically be associated with EPS, OBS, or OCS. Based on the results from classifier 210, the packets or traffic streams are processed according to one or more of the following switching modes: (1) EPS mode: Packets to be sent in the EPS mode are queued and transmitted on a packet by packet basis; (2) OBS mode: Packets or flows in the OBS mode are assembled into bursts according to the destination egress edge router address, and sent according to OBS mode protocols; and/or (3) OCS mode: Packets belonging to an optical circuit are sent on the lightpaths set up by the optical circuit switching protocols. In accordance with the switching mode, the packets or traffic streams are processed by EPS mode ingress packet processor 215, OBS mode ingress burst assembler 220, or OCS mode ingress circuit manager 225. In some embodiments, one or more of the EPS, OBS, or OCS modes may not be desired for traffic management. As such, the corresponding processor/assembler/manager may not receive any data from the classifier 210. In some embodiments, one or more mode specific processing units may not be configured. Switch 230 routes data to a desired location when outputting to DWDM transmitters 235. All wavelengths from the DWDM transmitters 235 are combined onto the outgoing DWDM link using a optical multiplexer (MUX) 240, such as a passive optical multiplexer. For example, packets for EPS, burst headers and burst for OBS, and optical signals for OCS are combined by MUX 240. In some embodiments, data from the edge router 130 are routed through RA-OBS core routers 120. In some embodiments, data from the edge router 130 are routed through traditional core router nodes via established lightpaths. In some embodiments, data from the edge router 130 are routed through RA-OBS core routers along with traditional core router nodes via established light paths.

In the egress direction, the wavelengths on the incoming DWDM link are separated using an optical demultiplexer (DEMUX) 245. DWDM receivers 250 convert optical signals back to the electronic domain. Switch 255 routes data to the corresponding traffic processors in egress traffic manager 257 based on the switching modes of the wavelengths for switching mode specific processing. For example, packets for the EPS mode are sent to EPS mode egress packet processor 260; converted data bursts and burst header packets for OBS mode are sent to OBS mode egress burst assembler 265; and converted optical data for OCS mode is sent to OCS mode egress circuit manager 270. Egress classifier 275 inspects the data from the traffic processors and forwards the data to appropriated line interfaces 205 for output to the desired network.

Figure 3:
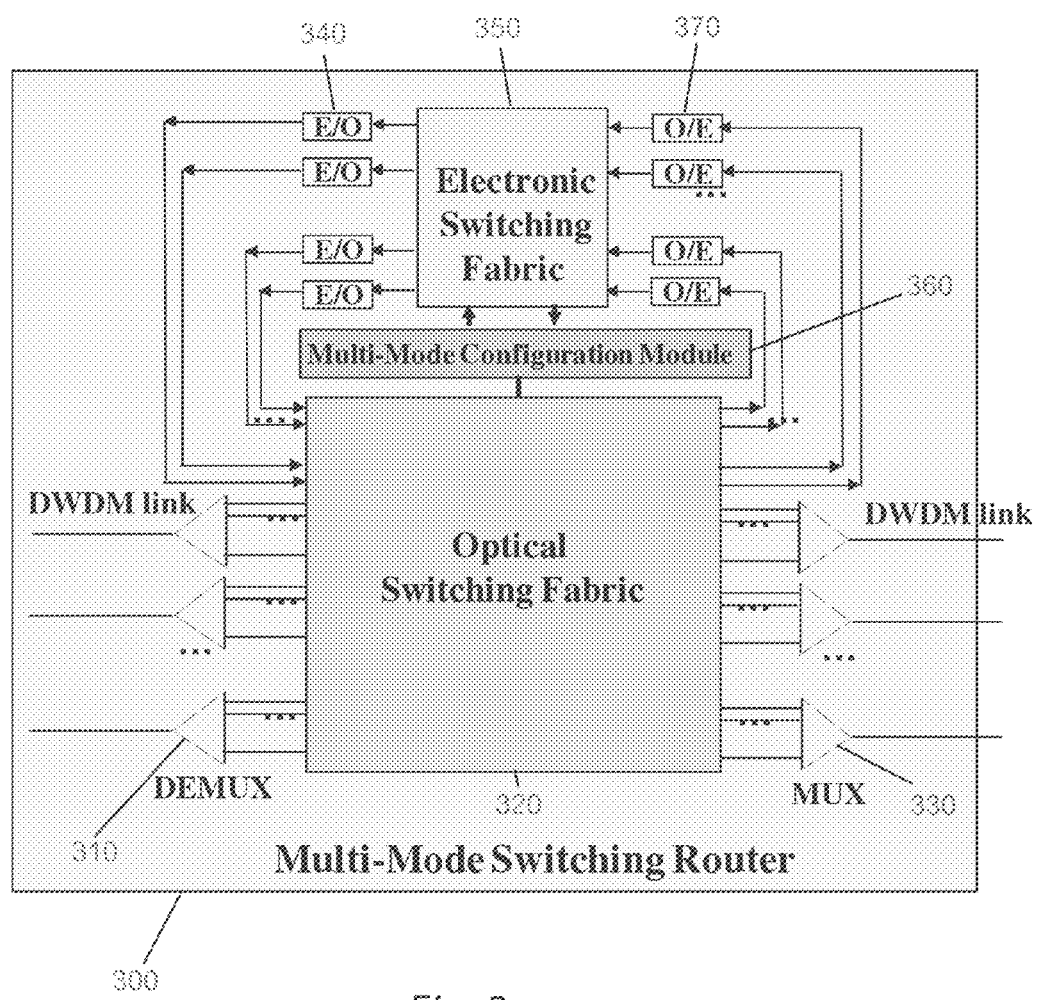
FIG. 3 is an illustrative implementation of a multi-mode switching router.
Figure 4:
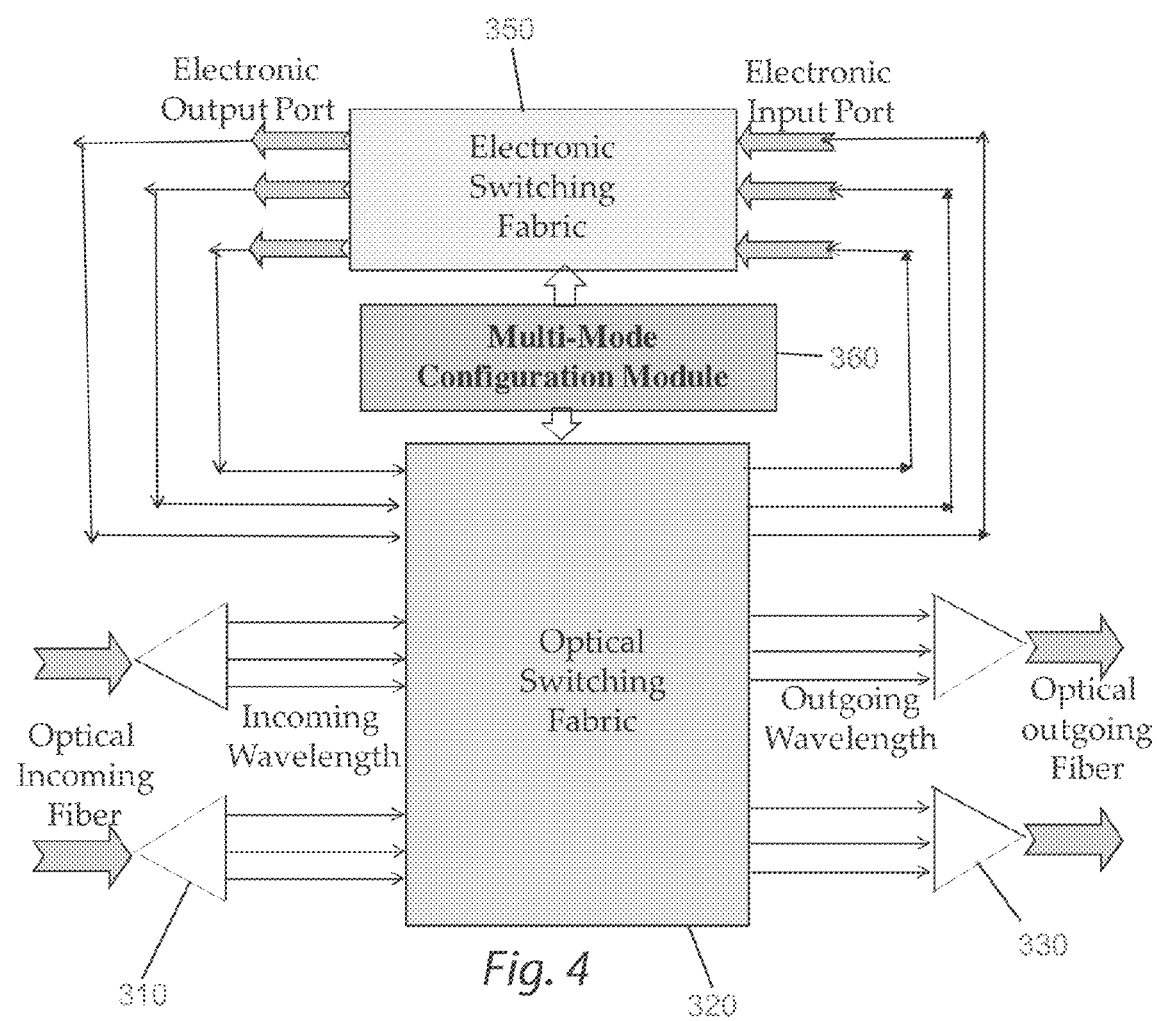
FIG. 4 is an illustrative implementation of interfaces to multi-mode switching router.

FIG. 3 is an illustrative implementation of a multi-mode switching router 300 that provides dynamic wavelength configurations/reconfigurations to all supported switching modes. FIG. 4 is an illustrative implementation of data flow through a multi-mode switching router 300. The multi-mode wavelength switching router, or core router, allows the EPS mode, the OCS mode, and the OBS mode to share DWDM wavelengths dynamically, which reduces the blocking probability dramatically. This unified approach provides tremendous benefits where all DWDM wavelengths can be dynamically configured in the OBS, OCS and EPS modes.

Multi-mode switching router 300 may provide demultiplexers 310, optical switching fabric 320, multiplexers 330, E/O converters 340, electronic switching fabric 350, multi-mode configuration module 360, and O/E converters 370. Each demultiplexers 310 may receive a DWDM signal, which may contain data provided in EPS, OCS, and/or OBS modes. Demultiplexer 310 separates incoming wavelengths for optical switching fabric 320. For example, demultiplexer 310 may separate a signal into separate wavelengths ($w_0$, $w_1$, $w_2$ ... $w_n$). At least one wavelength channel in each DWDM link is configured as the control channel, while the rest can be dynamically reconfigured in any of three switching modes, namely EPS, OCS and OBS. Control packets for different switching modes can share the same control channel. For example, wavelength $w_0$ may be a control wavelength; wavelength $w_1$ may be in the OBS mode and carries data bursts; wavelength $w_2$ is set to the EPS mode to carry packets which are switched electronically; and wavelength $w_3$ is in the OCS mode.

Optical switching fabric 320 receives optical signals from demultiplexers 310 and E/O converters 340 and manages switching of the optical data to a desired output. In accordance with the mode (EPS, OCS, or OBS), data may be routed for output to multiplexers 330 or to O/E converter 370 for electronic processing. Each multiplexer 330 combines received signals from optical switching fabric 320 for output to a DWDM link.

The electronic data may then be processed by electronic switching fabric 350 for electronic switching. Electronic switching fabric 350 may route the electronic data to multi-mode configuration module 360 for processing or to a desired E/O converter 340. For example, routing to E/O converter 340 or multi-mode configuration module 360 may depend on the output mode desired, whether wavelength conversion is desired, whether conversion to a different mode is desired, whether control data needs to be modified, or the like. Multi-mode configuration module 360 may control the configurations of optical switching fabric 320 and electronic switching fabric 350. In some embodiments, multi-mode configuration module 360 may provide processing necessary to convert between EPS, OCS, and OBS modes. In some embodiment, the multi-mode configuration module dynamically assigns switching modes to electronic input ports, electronic output ports, and outgoing wavelengths in optical outgoing fibers. The modes of the incoming wavelengths in optical incoming fiber may be set by upstream routers.

Referring back to the prior example in which $w_0$-$w_3$ are respectively assigned as a controller channel, OBS mode, EPS mode, and OCS mode—an exemplary discussion of processing of incoming DWDM links by multi-mode switching router 300 is discussed below. Control channel $w_0$ may be utilized for carrying the burst header packet (BHP). The control channel $w_0$ is directed by the optical switching fabric 320 to one of the Optical/Electrical (O/E) converters 370. The BHP is sent to the multi-mode configuration module 360 by the electronic switching fabric 350, and is processed electronically. After processing, the BHP is forwarded to an Electrical/Optical (E/O) converter 340 and is directed to an output port by the optical switching fabric 320. When the data burst arrives at the multi-mode switching router 300, an optical path has already been set up by the BHP to direct the burst to a specific output port through the optical switching fabric 320. An incoming wavelength configured in the EPS mode is routed to one of the O/E converters 320 through a pre-established lightpath in the optical switching fabric 320. The packets are then processed electronically, similar to a traditional electronic packet router. The packets are routed through the electronic switching fabric 350, and are converted to the output wavelength using an E/O converter 340. The packets may then be routed through the optical switching fabric 320 using a pre-established lightpath for output on a specific port on wavelength $w_2$. In an OCS mode, any data sent on an OCS mode wavelength (e.g. $w_3$) may follow the pre-established lightpath in the optical switching fabric to a specific output port.

Each of the four wavelengths is switched based the operation of the particular switching mode. The RA-OBS architecture can support concurrent DWDM multi-mode switching on an integrated router platform. The optical switching fabric 320 not only switches among incoming and outgoing wavelengths, but also interconnects the shared E/O 340 and O/E 370 converter pool. This shared pool of O/E 370 and E/O 340 converters may also provide indirect wavelength conversion for OCS and OBS connections by converting the optical signals back into the electrical domain, and retransmit them on a different wavelength using tunable lasers, which is considered the most practical solution in the near future. Further detailed discussion of concurrent DWDM Multi-Mode switching and traffic management is provided in U.S. application Ser. No. 13/325,544 filed on Dec. 14, 2011, and U.S. application Ser. No. 13/434,597 filed on Mar. 29, 2012, which are incorporated by reference herein.

In RA-OBS networks, different switching modes can share the wavelengths which can be reconfigured based on traffic requirements. An integrated DWDM multi-mode scheduling approach which can schedule three types of switching, namely, EPS, OCS and OBS within the same integrated scheduler may allow for better channel utilization and more flexibility in providing and managing different services. The integrated multi-mode scheduling can efficiently provide multi-mode reconfiguration along with dynamic burst scheduling.

Control mode configuration: The multi-mode configuration module may receive three types of control packets: EPS channel configuration packets (EPS_CP), OCS control packet (OCS_CP) and OBS burst header packet (BHP). The control wavelengths are pre-configured to be forwarded to the O/E ports through the lightpaths in the optical switching fabric, and are further directed to the multi-mode configuration module for processing. The processed control packets are forwarded to E/O ports by the electronic switching fabric, and are sent on pre-established lightpaths in the optical switching fabric to outgoing DWDM links.

EPS mode reconfiguration: To configure an incoming wavelength in the EPS mode, one available O/E converter is selected, and a lightpath is set up in the optical switching fabric to route the incoming wavelength to the selected O/E converter. To configure an outgoing wavelength in the EPS mode, one available outgoing wavelength is selected, along with one available E/O converter to produce the desired wavelength. A lightpath is then set up in the optical switching fabric to route the wavelength to the desired output port.

OCS mode reconfiguration: OCS wavelength setup and teardown are achieved by the OCS mode control packet. To establish an OCS connection with no wavelength conversion, the outgoing wavelength is the same as the incoming wavelength so the optical switching fabric is configured to direct the input wavelength to the output wavelength. If the same wavelength is not available, the scheduler will select one available outgoing wavelength, and the incoming wavelength is routed to one available pair of O/E and E/O converters for wavelength conversion.

OBS mode dynamic burst scheduling: OBS burst scheduling is utilized to find an available outgoing wavelength to carry the burst. To minimize wavelength conversion, the wavelength that is the same as the incoming wavelength is checked first. When the same wavelength is not available, an available outgoing wavelength is selected for the duration of the burst. The incoming burst on the OBS mode wavelength is directed through the shared pool of O/E and E/O converters for wavelength conversion before being routed to the selected outgoing DWDM link.

Figure 5:
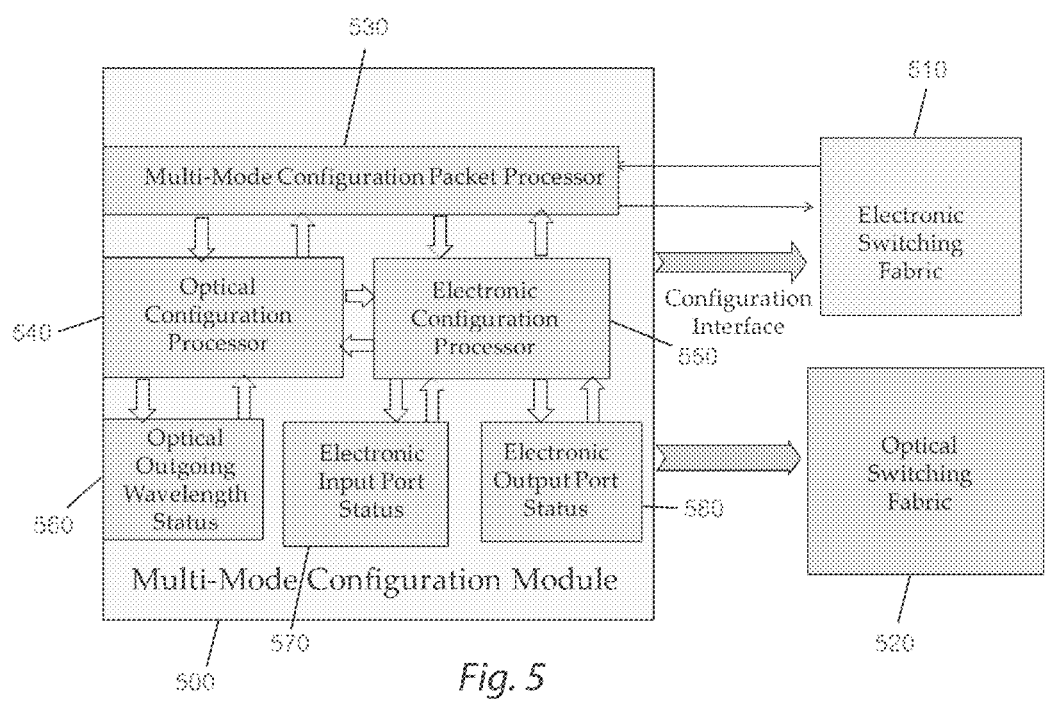
FIG. 5 is an illustrative implementation of a multi-mode configuration module.

FIG. 5 is an illustrative implementation of a multi-mode configuration module 500. Multi-mode configuration module 500 manages electronic switching fabric 510 and optical switching fabric 520 to provide dynamic configuration/reconfiguration to support multi-mode switching. Multi-mode configuration module 500 may provide a multi-mode configuration packet processor 530, optical configuration processor 540, electronic configuration processor 550, optical outgoing wavelength status 560, electronic input port status 570, and electronic output port status 580.

The OBS, OCS and EPS mode connections are handled in a unified manner, allowing complete sharing of all DWDM wavelengths dynamically among the three switching modes. Multi-mode configuration packets are processed by the multi-mode configuration module. The multi-mode configuration packet may carry an OBS mode burst scheduling request, OCS setup request, OCS teardown request, EPS mode setup request, or EPS teardown request.

The optical outgoing wavelength status, the electronic input port status, and the electronic output port status may be recorded. The multi-mode configuration module may keep track of switching mode assignment status and of the time and switching mode correlations for all wavelength channels. The multi-mode configuration module may provide delayed scheduling for the OBS, OCS and EPS modes. The multi-mode configuration module may provide Quality-of-Service (QoS) to multi-mode wavelength scheduling.

Figure 7:
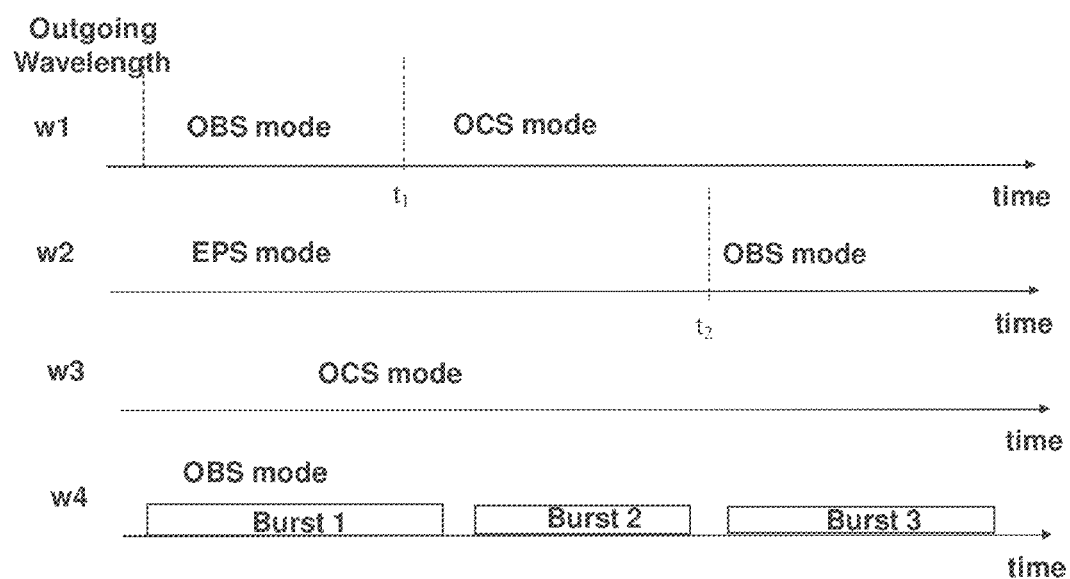
FIG. 7 is an illustrative implementation of switching mode sharing in outgoing optical wavelengths.

Multi-mode configuration packet processor 530 receives configuration packets containing configuration information. Configuration information may include but not limited to the type of the configuration packet (e.g. OBS, OCS setup, OCS teardown, EPS setup, EPS teardown), the mode to be configured (e.g. OBS, OCS, EPS), the offset time between the configuration packet and the start time of the connection, the duration of the connection, the arriving input port, the arriving wavelength, the destination output port, priority information, or the like. The configuration information is utilized to manage scheduling, configuration, and reconfiguration of the DWDM wavelengths. For example, configuration information may be utilized to determine switching mode assignments, timing information, and switching mode correlation for all wavelength channels. Multi-mode configuration packet processor 530 correlates optical configuration information with electronic configuration information as needed. The optical and electronic configuration information are each provided to a corresponding optical configuration processor 540 or electronic configuration processor 550. The combined information obtained from the optical configuration processor 540 and electronic configuration processor 550 are used to determine the final configuration for the outgoing data. Optical configuration processor 540 utilizes the incoming optical configuration information to assign a wavelength for an incoming switching mode and to managing switching of an optical switching fabric 520. Optical configuration processor 540 can retrieve wavelength assignments and timing information for different switching modes from outgoing wavelength status 560. The wavelength assignments and timing information may be utilized to allocate a wavelength for data corresponding to incoming configuration packets. Optical outgoing wavelength status 560 stores the wavelength assignments and timing information so that mode assignments for different wavelengths at various times can be easily determined. An example of the modes of the outgoing optical wavelengths is shown in FIG. 7. Using the integrated multi-mode scheduler discussed herein, a single wavelength can be dynamically shared among different wavelength for various switching modes, resulting in much lower connection blocking probability compared to statically partitioned wavelengths. In FIG. 7, wavelength w1 is shared between OBS and OCS mode connections; w2 is shared between EPS and OBS mode connections; w3 is dedicated to an OCS mode connection; and w4 is shared among three OBS mode connections.

The connection status shown in FIG. 7 is the scheduling result of the unified multi-mode configuration module 500. Information on the wavelength allocated and timing information for the incoming configuration packet may be provided to multi-mode configuration processor 530 or optical outgoing wavelength status 560 to update status information stored by optical outgoing wavelength status 560. This allows incoming optical wavelengths to be processed in accordance with wavelength availability, and configuration and reconfiguration may be performed as necessary to allocate an available wavelength. This allows multi-mode configuration module 500 to provide routing instructions for received wavelengths to optical switching fabric 520.

Figure 8:
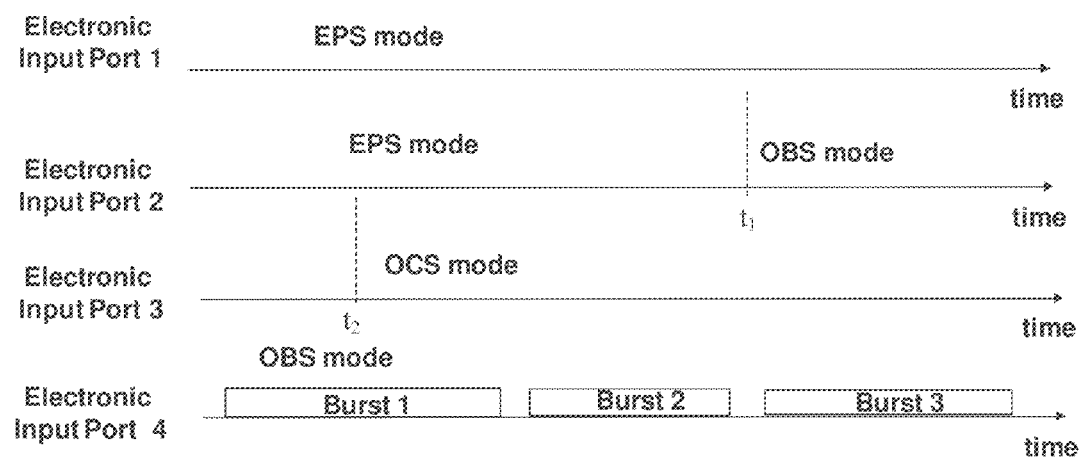
FIG. 8 is an illustrative implementation of switching mode sharing in electronic input ports.
Figure 9:
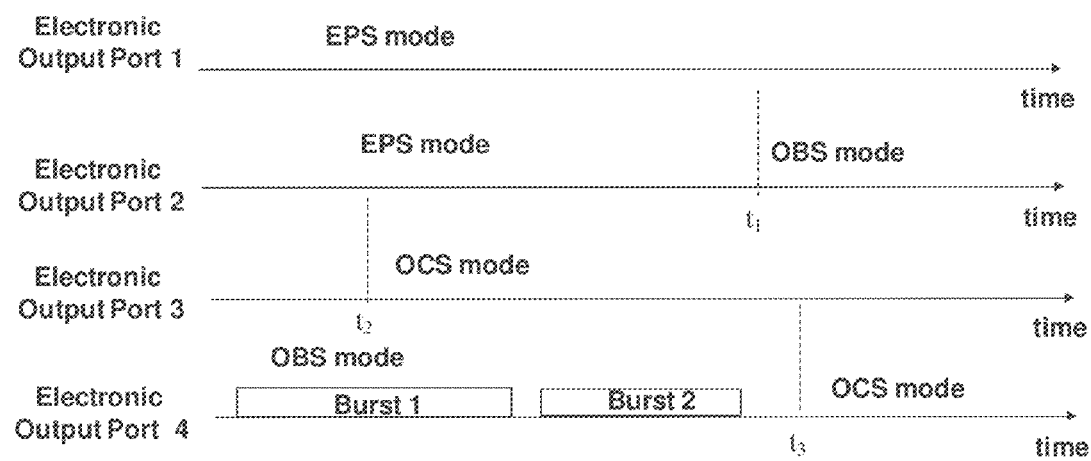
FIG. 9 is an illustrative implementation of switching mode sharing in electronic output ports.

Electronic configuration processor 550 utilizes the electronic configuration information to assign electronic ports of electronic switching fabric 510 for an EPS, OBS, or OCS mode. Electronic configuration processor 550 can determine status information for electronic input and output ports from electronic input port status 570 and electronic output port status 580 to determine available electronic ports for incoming data corresponding to the electronic configuration information. Electronic configuration processor 550 may allocate available input and output ports for the incoming data, and the electronic ports allocated for the incoming data may be provided to electronic input port status 570 and electronic output port status 580 to keep track of the statuses of electronic ports. In particular, status information for electronic input ports are stored in the electronic input port status module 570, and status information for electronic output ports are stored in the electronic output port status module 580. Examples of the modes of electronic input and output ports are shown in FIGS. 8 and 9, respectively. In FIG. 8, electronic input port 1 is dedicated to an EPS mode connection; port 2 is shared between an EPS mode connection terminated at t1 and an OBS mode connection; port 3 is utilized by an OCS mode connection starting at t2; and port 4 is shared among three OBS mode connections. In FIG. 9, electronic output port 1 is dedicated to an EPS mode connection; port 2 is assigned to an EPS mode connection followed by an OBS mode connection; port 3 is configured as an OCS mode connection starting at t2; and port 4 is shared by two OBS mode connections followed by an OCS connection. This allows incoming data to be processed in accordance with electronic port availability, and configuration and reconfiguration may be performed as necessary for the EPS, OBS, or OCS mode. Additionally, this allows multi-mode configuration module 500 to provide port routing instructions for received data to electronic switching fabric 510.

In the case of an OCS connection request, in some embodiments, an OCS connection request is converted internally to a burst connection request of infinite length at the connection setup time by the multi-mode configuration module 500. The actually connection time is adjusted when a tear down control packet is received by the multi-mode configuration module 500. The offset time in the system supports an instant reservation (when the offset is zero), or a delayed reservation (when the offset is non-zero). The connection request and management is achieved in the multi-mode configuration packet processor 600. The multi-mode parameter equalizer 650 allows multi-mode configuration packet processor 600 to handle configuration requests of all switching modes in a unified way. As a result, optical circuit connections and/or EPS connections can be scheduled along with the OBS connections.

In some embodiments, reconfiguration of a wavelength in the EPS mode may be provided. An incoming wavelength in the EPS mode is routed to an O/E converter through the optical switching fabric. Similarly, an outgoing wavelength in the EPS mode is routed from an E/O converter to the outgoing link through the optical switching fabric. An EPS connection stays in effect until the next reconfiguration request, utilizing the multi-mode parameter equalizer 650, the operation of setting up a wavelength in the EPS mode can share resources for setting up an OCS connection and/or OBS connection with wavelength conversion.

Figure 6:
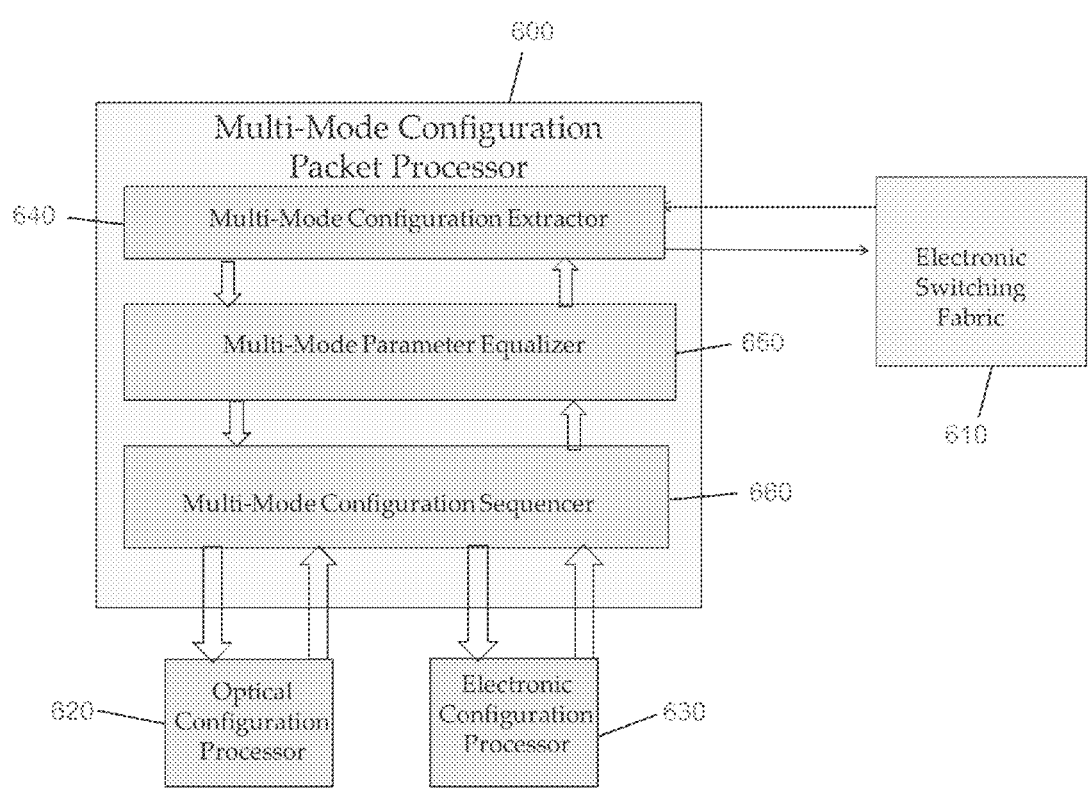
FIG. 6 is an illustrative implementation of a multi-mode configuration packet processor.

FIG. 6 is an illustrative implementation of a multi-mode configuration packet processor 600. As shown previously, multi-mode configuration packet processor 600 may be coupled to electronic switching fabric 610, optical configuration processor 620, and electronic configuration processor 630. The multi-mode configuration packet processor 600 may provide a multi-mode configuration extractor 640, multi-mode parameter equalizer 650, and multi-mode configuration sequencer 660.

The multi-mode configuration extractor 640 extracts configuration information carried in configuration packets, such as the mode of the configuration/reconfiguration, the start time of the configuration, the duration of the connection, the input and output ports, the wavelength to be configured, and/or the like. The multi-mode parameter equalizer 650 receives the configuration information from the multi-mode configuration extractor 640 and converts the parameters used in an OBS mode, OCS mode and EPS mode into a unified internal parameter set such that a single set of configuration processors can be used to schedule and configure the different switching modes, which allows complete sharing of the wavelengths among different modes. In some embodiments, the multi-mode parameter equalizer 650 converts an OCS mode connection request to an OBS mode connection request with infinite burst length. In some embodiments, the multi-mode parameter equalizer 650 converts an EPS mode connection request to a wavelength converting OBS mode connection request with infinite burst length. In some embodiments, the multi-mode parameter equalizer 650 converts an OCS mode teardown request to a continuing OBS mode connection request with zero burst length. In some embodiments, the multi-mode parameter equalizer 650 converts an EPS mode teardown request to a continuing wavelength converting OBS mode connection request with zero burst length.

Multi-mode parameter equalizer 650 separates the received configuration information into optical configuration information and electronic configuration information. The optical configuration information and electronic configuration information may be provided to multi-mode configuration sequencer 660. The multi-mode configuration sequencer 660 sequences operations needed by the OBS, OCS and EPS configurations such that the optical configuration processor 620 and the electronic configuration processor 630 can be designed and operated in a switching mode independent manner. This greatly reduces the complexity of the system and maximizes resource sharing. The scheduling results from the optical configuration processor 620 and the electronic configuration processor 630 are used to determine the configuration status of the multi-mode configuration requests by the multi-mode configuration packet processor 600.

FIG. 7 is an illustrative example of outgoing optical wavelength channels being configured and reconfigured for sharing among different switching modes by an optical configuration processor. An outgoing DWDM link may provide several wavelength channels. In the example shown, wavelengths $w_1$-$w_4$ represent the data channels, and a control wavelength $w_1$ (not shown) represent the control channel.

Control information, which may include configuration information, is provided via the control channel for an EPS, OBS, and OCS modes. The control information may be utilized to manage traffic and switching in the system. Each of the wavelengths $w_1$-$w_4$ may be utilized for an EPS, OBS, and OCS modes. For instance, in the example shown, wavelengths $w_3$ and $w_4$ are shown as being allocated for an OCS mode and OBS mode for the time frame shown. However, when a outgoing wavelength is not available it may be desirable to allocate another wavelength. For example, if an incoming OCS mode data is provided on wavelength $w_4$ and scheduled for output at time $t_1$, when wavelength $w_4$ is already allocated for an OBS mode, it may be desirable to switch output of the OCS data over to an available wavelength $w_1$ at time $t_1$. Multi-mode configuration module may control routing through optical switching fabric and electronic switching fabric route data to the correct outgoing wavelength. For example, multi-mode configuration module may cause incoming data on wavelength $w_4$ to be switch over to wavelength $w_1$ at time $t_1$. Another example is shown on wavelength $w_2$ which is switched from an EPS mode to and OBS mode at time $t_2$.

FIG. 8 is an illustrative example of the electronic input ports being configured and reconfigured for sharing among different switching modes by an electronic configuration processor 630. Electronic input ports for electronic switch fabric 610 may be allocated for an EPS, OBS, or OCS mode. In the example shown, input ports 1-4 are initially allocated for the EPS mode, allocated for the EPS mode, unallocated, and allocated for the OBS mode. Input ports 1 and 4 remain allocated for the entire time period shown. However, input port 2 is switched over to an OBS mode at time $t_1$, and input port 3 is allocated for an OCS mode at time $t_2$. The multi-mode configuration module 500 may control routing through optical switching fabric and electronic switching fabric to route data to the correct electronic input port.

FIG. 9 is an illustrative example of the electronic output ports being configured and reconfigured for sharing among different switching modes by an electronic configuration processor 630. In the example shown, output ports 1-4 are initially allocated for the EPS mode, allocated for the EPS mode, unallocated, and allocated for the OBS mode. Input port 1 remain allocated for the entire time period shown. However, output port 2 is switched over to an OBS mode at time $t_1$, output port 3 is allocated for an OCS mode at time $t_2$, and output port 4 is switched over to an OCS mode at time $t_3$. The multi-mode configuration module 500 may control routing through electronic switching fabric 610 to route data to the correct electronic output port.

Figure 10A:
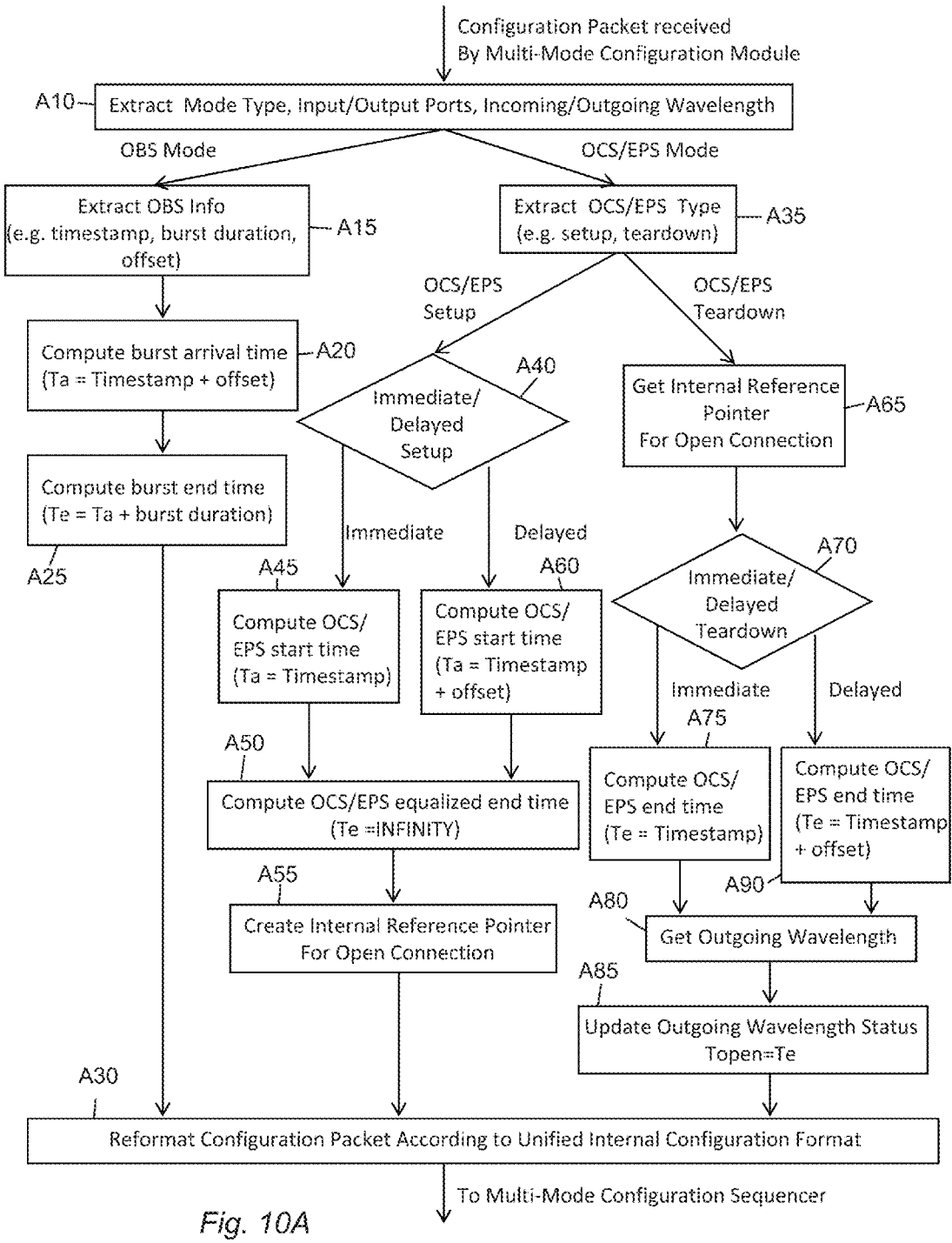
FIG. 10A is an illustrative implementation of a flow chart demonstrating operations of components of a multi-mode configuration packet processor.
Figure 10B:
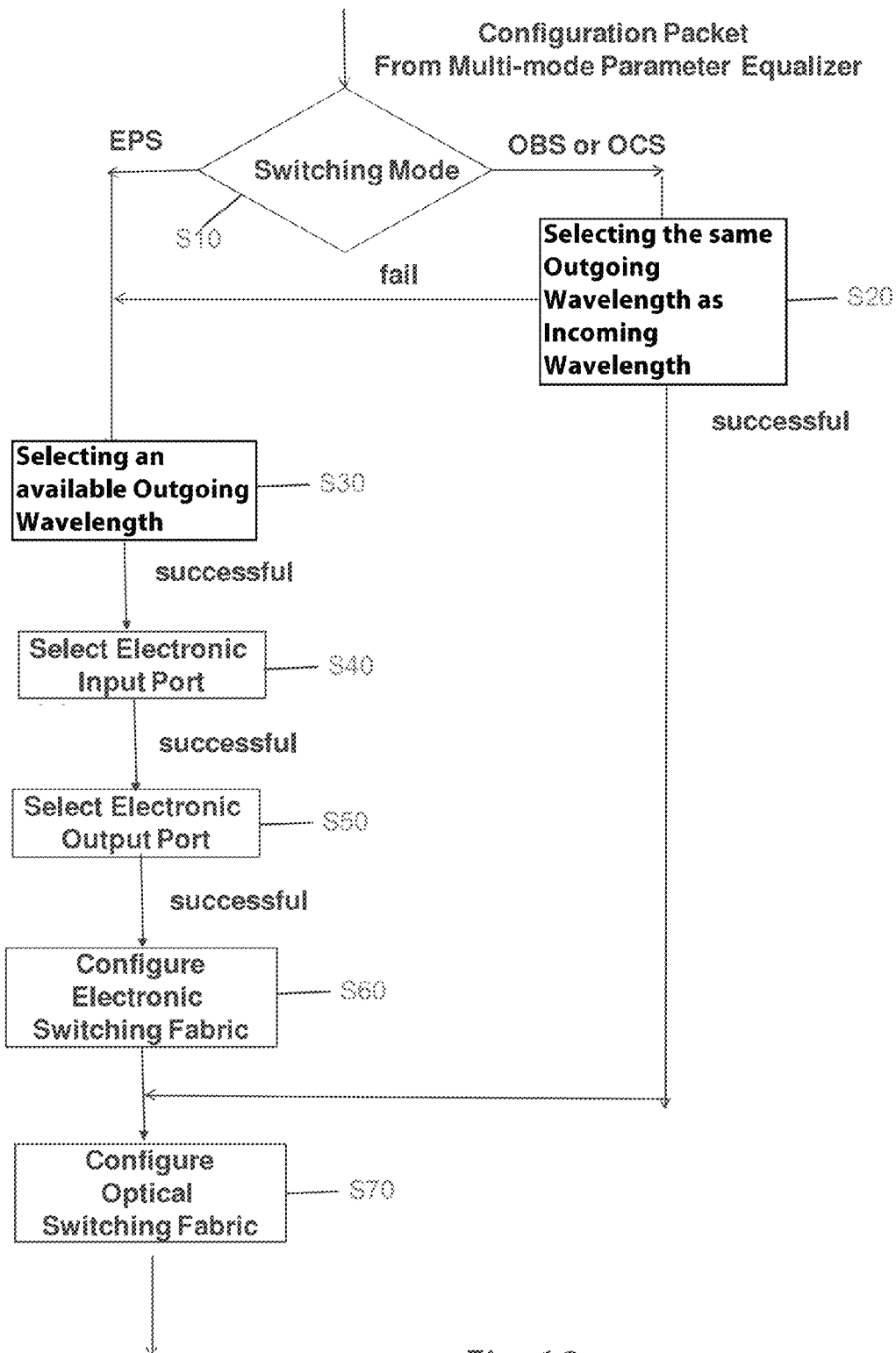
FIG. 10B is an illustrative implementation of a flow chart for a multi-mode configuration packet processor operating in a multi-mode configuration module.

FIG. 10A and FIG. 10B are flow charts illustration the operations of a multi-mode configuration module. The flow charts are followed to convert the configuration requests of different modes into a unified data structure and format for accessing shared channel status. FIG. 10A is a flow chart illustrating the combined operations of the multi-mode configuration extractor 640 and the multi-mode parameter equalizer 650. In step A10, a configuration packet is received by multi-mode configuration module 500, and information regarding mode type, input/output ports, incoming/outgoing wavelength, or the like is extracted. If the mode type is an OBS mode, the OBS information is extracted in step A15. For example, information such as time stamp, burst duration, offset, or the like may be extracted. The burst arrival time (Ta) may be calculated by adding the offset to the time stamp in step A20. The burst end time (Te) may be calculated by adding burst duration to the burst arrival time (Ta) in step A25.

Next, the configuration packet may be reformatted to a unified internal configuration format in step A30, and the reconfigured packet may be provided to a multi-mode configuration sequencer.

If the extracted information in A10 indicates that the mode is an OCS or EPS mode, OCS or EPS type data is extracted in step A35. For example, OCS/EPS setup or teardown information may be extracted. If OCS/EPS setup information is found, it is determined whether immediate or delayed setup is necessary in step A40. If immediate setup is desired, the OCS/EPS start time (Ta) is computed in step A45 by determining a timestamp. If a delayed setup is desired, an OCS/EPS start time (Ta) is computed by adding the timestamp and offset. Once the start time (Ta) is determined, the OCS/EPS equalized end time (Te) is set to infinity in step A50. In other words, a channel is allocated for an infinite amount of time in the OCS/EPS modes, which is considered as an open connection. An internal reference for open connection is created in step A55 to identify the connection. This internal reference allows the open connection to be identified later for the teardown operation if a teardown configuration packet is received. Next the OCS/EPS configuration packet may be reformatted to a unified internal configuration format in step A30, and the reconfigured packet may be provided to a multi-mode configuration sequencer.

If OCS/EPS teardown is desired, an internal reference for open connection is retrieved in step A65. In step A70, it is determined if immediate or delayed teardown is desired. If immediate teardown is desired, OCS/EPS end time (Te) is determined by computing an end timestamp in step A75. If delayed teardown is desired, OCS/EPS end time (Te) is determined by adding the end timestamp and an offset in step A90. The outgoing wavelength utilized by the OCS/EPS open connection is retrieved using the internal reference in step A80. The outgoing wavelength status is updated to indicate that the wavelength is open (Topen) at the end time (Te) in step A85. The OCS/EPS configuration packet may then be reformatted to a unified internal configuration format in step A30, and the reconfigured packet may be provided to a multi-mode configuration sequencer. As channels are allocated for an infinite amount of time for OCS/EPS modes, the teardown request may be received to update a channels status if desired.

FIG. 10B is a flow chart illustrating configuration operations in a multi-mode configuration packet processor. In particular, the multi-mode configuration sequencer 660, interacting with the optical configuration processor 620, and the electronic configuration processor 630, which in turn interact with the optical outgoing wavelength status 560, electronic input port status 570, and the electronic output port status 580. In some embodiments, a multi-mode configuration sequencer 660 may sequence configuration operations in accordance with these configuration operations. A configuration packet retrieved by multi-mode parameter equalizer 650 may provide information on a switching mode. In step S10, the configuration packet is utilized to determine a switching mode. If the switching mode is an EPS mode, the configuration operation moves to steps S30-S60. If the switching mode is an OBS or OCS mode, a channel selection operation on the same outgoing wavelength as the incoming wavelength is performed in step S20. In step S20 a check on the status of the outgoing channel on the same wavelength as the incoming wavelength is first performed. If the outgoing wavelength is available to accommodate the connection request, it is selected to carry the new connection. If the selection in step S20 is successful, wavelength conversion is not necessary and the configuration operation goes to step S70 where the optical switching fabric is configured. For example, the optical switching fabric can be configured to route the incoming wavelength on lightpath that directs the data to an output port with an outgoing wavelength that is the same as the incoming wavelength. If the outgoing wavelength selection in step S20 fails (i.e. the same outgoing wavelength is not available and wavelength conversion is necessary), then the configuration operation proceeds to step S30.

In step S30, an outgoing wavelength is selected in accordance with the wavelengths that are available at the output ports. Step S30 is repeated until an outgoing wavelength is successfully selected. An electronic input port is selected in step S40, and the EPS data or OBS/OCS data requiring wavelength conversion is routed to the selected electronic input port. When selection of an electronic input port is successful, an electronic output port is selected in step S50. Once the electronic input and output port have been successfully selected, the electronic switch fabric 510 can be configured to route data accordingly in step S60. In step S70, the optical switching fabric 520 can be configured to route data to desired output port. This configuration operation allows the multi-mode configuration packet processor 530 to determined proper data routing for incoming EPS, OBS, or OCS data through multi-mode switching router.

Figure 11:
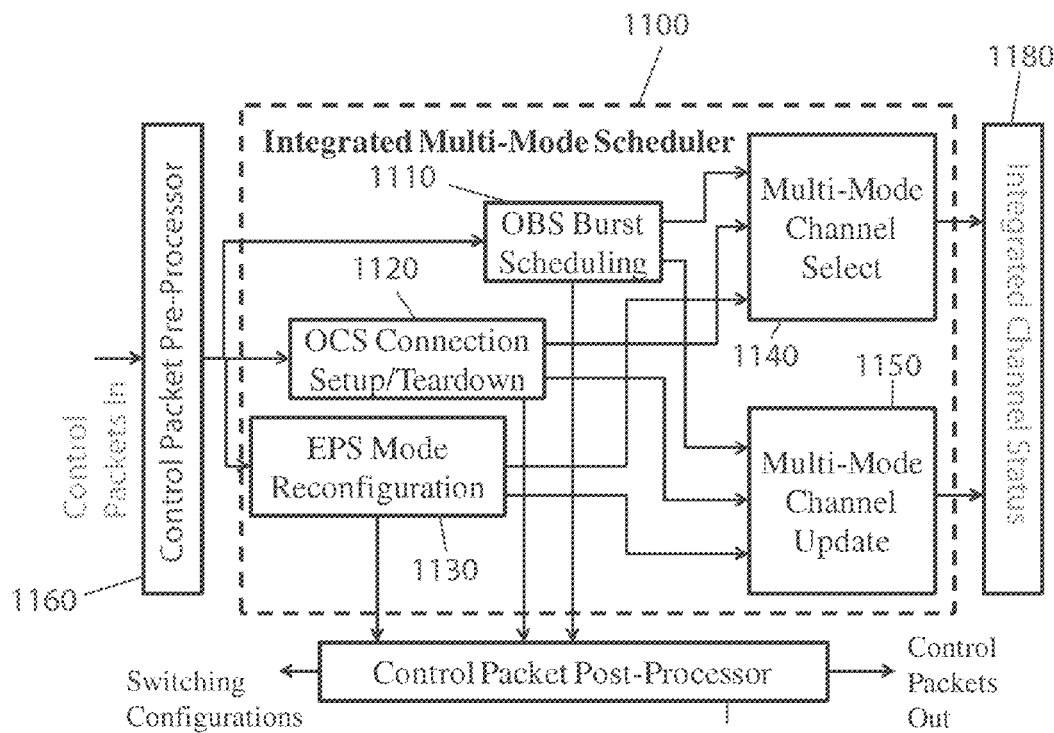
FIG. 11 is an illustrative implementation of an integrated multi-mode scheduler.

FIG. 11 is an illustration of an embodiment of an integrated multi-mode scheduler module 1100. It will be recognized by one of ordinary skill in the art that the integrated multi-mode scheduler and multi-mode configuration module may provide similar functionality. As such, the term multi-mode configuration module may be used interchangeably with the term integrated multi-mode scheduler herein. The integrated multi-mode scheduler 1100 provides an integrated multi-mode scheduling approach where the multi-mode channel selection and channel update unit can be shared among all three functions: burst scheduling in the OBS mode, connection setup/teardown in the OCS mode, and channel reconfiguration in the EPS mode. The integrated multi-mode scheduler 1100 not only provides an integrated solution to the problem, but also enables dynamic wavelength sharing among different switching modes. As noted previously, the OCS connection setup/teardown and EPS channel reconfigurations are treated as a special case of OBS scheduling. Integrated multi-mode scheduler 1100 may provide an OBS burst scheduling 1110, OCS connection setup/teardown 1120, EPS mode reconfiguration 1130, multi-mode channel select 1140, and multi-mode channel update 1150 modules. In some embodiments, it may be desirable to substitute one or more of the OBS burst scheduling 1100, OCS connection setup/teardown 1120, or EPS mode reconfiguration 1130 with an existing OBS, OCS, or EPS module providing similar functionality. Further, in some embodiments, one or more of the OBS burst scheduling 1100, OCS connection setup/teardown 1120, or EPS mode reconfiguration 1130 may be removed from the integrated multi-mode scheduler 1100. For example, in the case that an EPS mode is not utilized in a network, an EPS mode reconfiguration 1130 is unnecessary and may be left out of the integrated multi-mode scheduler 1100.

OBS burst scheduling module 1110 supports OBS burst scheduling. As in traditional OBS networks, bursts sent on wavelengths configured in the OBS mode are scheduled onto DWDM channels based on the two parameters carried in the BHP: the offset and the burst length. The offset time defines the time between the transmission of the first bit of the BHP and the first bit of the data burst. The length field specifies the time duration of the burst. Usually a maximum burst length is used to restrict the size of the bursts. OBS burst scheduling module 1110 may receive BHP, and may utilize the parameters provided by the BHP to schedule a corresponding data burst to an available DWDM channel. The scheduling information for the OBS mode may be provided to multi-mode channel select 1140 and multi-mode channel update 1150 to track the status of DWDM channels.

OCS connection setup/teardown module 1120 treats OCS connections as extended OBS channel scheduling. In the case of an OCS connection request, an OCS connection can be treated as a burst of infinite length at the connection setup time. The actual connection time will be adjusted when a teardown control packet is received. As a result, OCS mode connection setup problem can be converted to an extended OBS channel scheduling operation. The offset time in the extended protocol can support both instant reservations (offset=0), or delayed reservations (offset>0). OCS connection setup/teardown module 1120 may receive connection setup or teardown request, and may utilize the parameters provided by the request to setup or teardown a DWDM channel for an OCS mode. The scheduling information for the OCS mode may be provided to multi-mode channel select 1140 and multi-mode channel update 1150 to track the status of DWDM channels.

Similarly, reconfiguring a wavelength in the EPS mode can be mapped to the problem of setting up an OCS connection that requires wavelength conversion. As described earlier, an incoming wavelength in the EPS mode will be routed to an O/E converter through the optical switching fabric, while an outgoing wavelength in the EPS mode is routed from an E/O converter to the outgoing link. EPS mode reconfiguration module 1130 allows an EPS connection to stay in effect until the next EPS reconfiguration request of the same channel, which can be treated as a connection teardown request in the OCS mode. Therefore, the operation of setting up a wavelength in the EPS mode can also be treated as an extended burst scheduling operation. The detailed algorithm for the integrated multi-mode scheduler is discussed further below. EPS mode reconfiguration module 1130 may receive EPS reconfiguration request, and may utilize the parameters provided by the request to schedule a DWDM channel for an EPS mode. The scheduling information for the EPS mode may be provided to multi-mode channel select 1140 and multi-mode channel update 1150 to track the status of DWDM channels.

Control packet pre-processor 1160 may receive control packets and route the packets according to a corresponding mode. For example, OBS control packets would be routed to OBS burst scheduling module 1110. The OBS, OCS and EPS modules discussed may be coupled to multi-mode channel select 1140 and multi-mode channel update 1150 modules. Multi-mode channel select module 1140 determines channel selections and provides the information to integrated channel status 1180. Similarly, multi-mode channel update module 1150 provides update channel information to the integrated channel status 1180. OBS burst scheduling 1110, OCS connection setup/teardown 1120, and EPS mode reconfiguration 1130 modules may also be coupled to control packet post processor 1170. Control packet post-processor 1170 can modify control packets to reflect any scheduling, configuration, reconfiguration changes, and/or convert control packet to a unified format. For example, if a received OCS connection is being wavelength converted from an incoming wavelength $w_3$ to an outgoing wavelength $w_2$, the control packet post-processor 1170 can modify the control packet to reflect the change.

EXAMPLES

Figure 12:
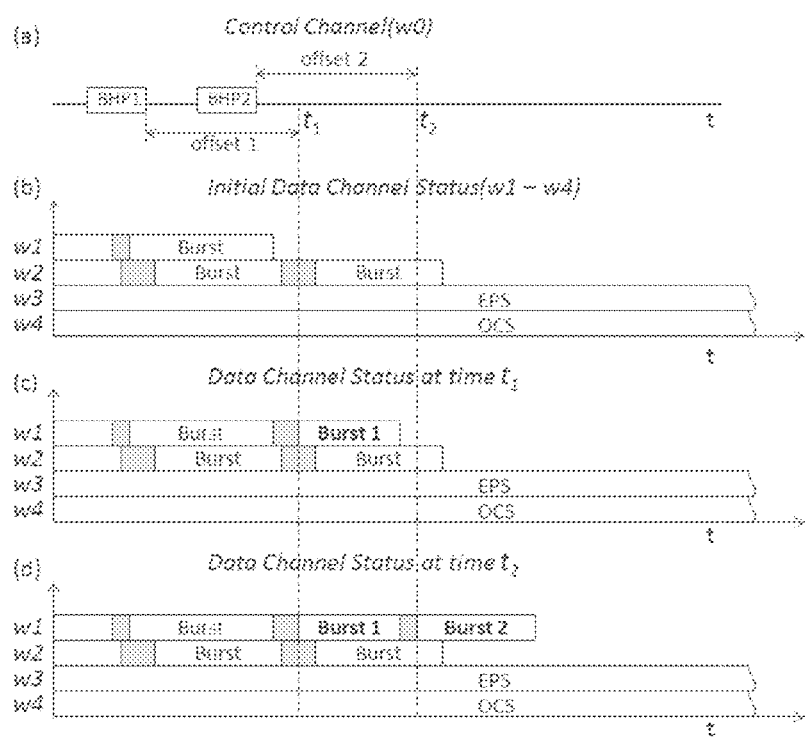
FIG. 12*a*-12*d* are an illustrative implementation of switching mode channel status during OBS scheduling.

To better understand the proposed integrated scheduling scheme, a few examples of operations under different circumstances are provided. FIGS. 12*a*-12*c* are illustrative examples of an integrated scheduling scheme. In particular, OBS scheduling with co-existence of EPS and OCS connections are shown. Data channel 3 and 4 are occupied by an EPS connection and an OCS connection, respectively. In FIG. 12*a*, two BHPs (BHP1 and BHP2) arrive on the control channel w0 in sequence. Since w3 and w4 occupied by EPS and OCS connections have infinite "burst" ending times set by the multi-mode 650, as shown in FIG. 12*b*, they automatically will not be selected by the scheduler for OBS connections. As a result, Burst 1 may be scheduled on w1 with updated channel map shown in FIG. 12*c*. Channel w1 may also be selected for Burst 2 as shown in FIG. 12*d*.

Figure 13:
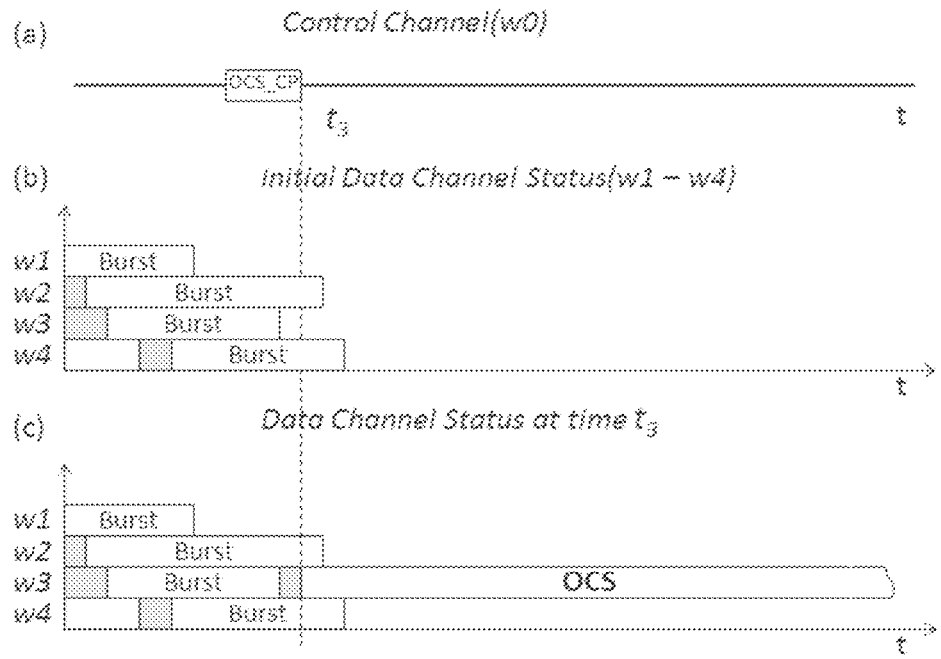
FIG. 13*a*-13*c* are an illustrative implementation of switching mode channel status during the addition of an OCS connection.

FIG. 13*a*-13*c* are another illustrative example of an integrated scheduling scheme. In particular, an example of adding a connection for OCS with existing OBS connections is illustrated. An OCS control packet (OCS_CP) is received on control channel w0. The integrated multi-mode scheduler utilizes initial data channel status information shown in FIG. 13*b* to find the most suitable channel w3 to accommodate the OCS connection request. The data channel status information is updated to indicate that the channel busy time of w3 is set to infinite ($\infty$) until a teardown control packet is received as shown in FIG. 13*c*.

Algorithm Description: An integrated multi-mode scheduling algorithm is described formally using the following procedures. The algorithm is suitable for high speed hardware implementation.

```
Integrated Scheduling (CP, H) {
    if (CP.type == EPS_SETUP)
        if ( an existing EPS wavelength can be shared )
            Send EPS setup ACK;
        else {
            Selected_Entry = Channel_Select(CP.start_time);
            if (Selected_Entry != -1) {
                Selected_Channel = H(Selected_Entry).chan;
                Channel_Update(Selected_Entry, ∞, 0);
                Send EPS setup ACK;         }
            else
                Send EPS setup NACK;   }
    elseif (CP.type == EPS_TEARDOWN)
        if ( no other EPS connection shares CP.chan) {
            temp_entry = Lookup(CP.chan);
            Channel_Update(temp_entry, CP.end_time, 1);   }
    elseif (CP.type == OCS_SETUP) {
        Selected_Entry = Channel_Select(CP.start_time);
        if (Selected_Entry != -1) {
            Selected_Channel = H(Selected_Entry).chan;
            Channel_Update(Selected_Entry, ∞, 0);
            Send OCS setup ACK;         }
        else
            Send OCS setup NACK; }
    elseif (CP.type == OCS_TEARDOWN) {
        temp_entry = Lookup(CP.chan);
        Channel_Update(temp_entry, CP.end_time, 1); }
    elseif (CP.type ==BHP) {
        Selected_Entry = Channel_Select(CP.arrival_time);
        if (Selected_Entry != -1) {
            Selected_Channel = H(Selected_Entry).chan;
            Channel_Update(Selected_Entry,
                        CP.arrival_time+ CP.burst_length, 0);   }
        else
            Discard CP;}}
Channel_Select(arrival _time) {
    if (H(0).horizon > arrival _time)
        return -1;
    else
        i = h - 1;
        while ((H(i).horizon > arrival _time)
                and (i ≥ 0))
            i = i - 1;
        return i; }
```

-continued

```
Channel_Update(Selected_entry, end_time, operation) {
    H(Selected_entry).horizon = end_time;
    temp_entry = H(Selected_entry);
    if(operation == 0) {
        j = Selected_entry + 1;
        while ((j < h)
            and (temp_entry.horizon > H(j).horizon)) {
            H(j - 1) = H(j);
            j = j + 1;       }
        H(j - 1) = temp_entry;
        return 1;   }
    elseif(operation == 1) {
        j = Selected_entry - 1;
        while ((j > 0)
            and (temp_entry.horizon < H(j).horizon)) {
            H(j + 1) = H(j);
            j = j - 1;         }
        H(j + 1) = temp_entry;
        return 1;   }
}
```

Figure 14A:
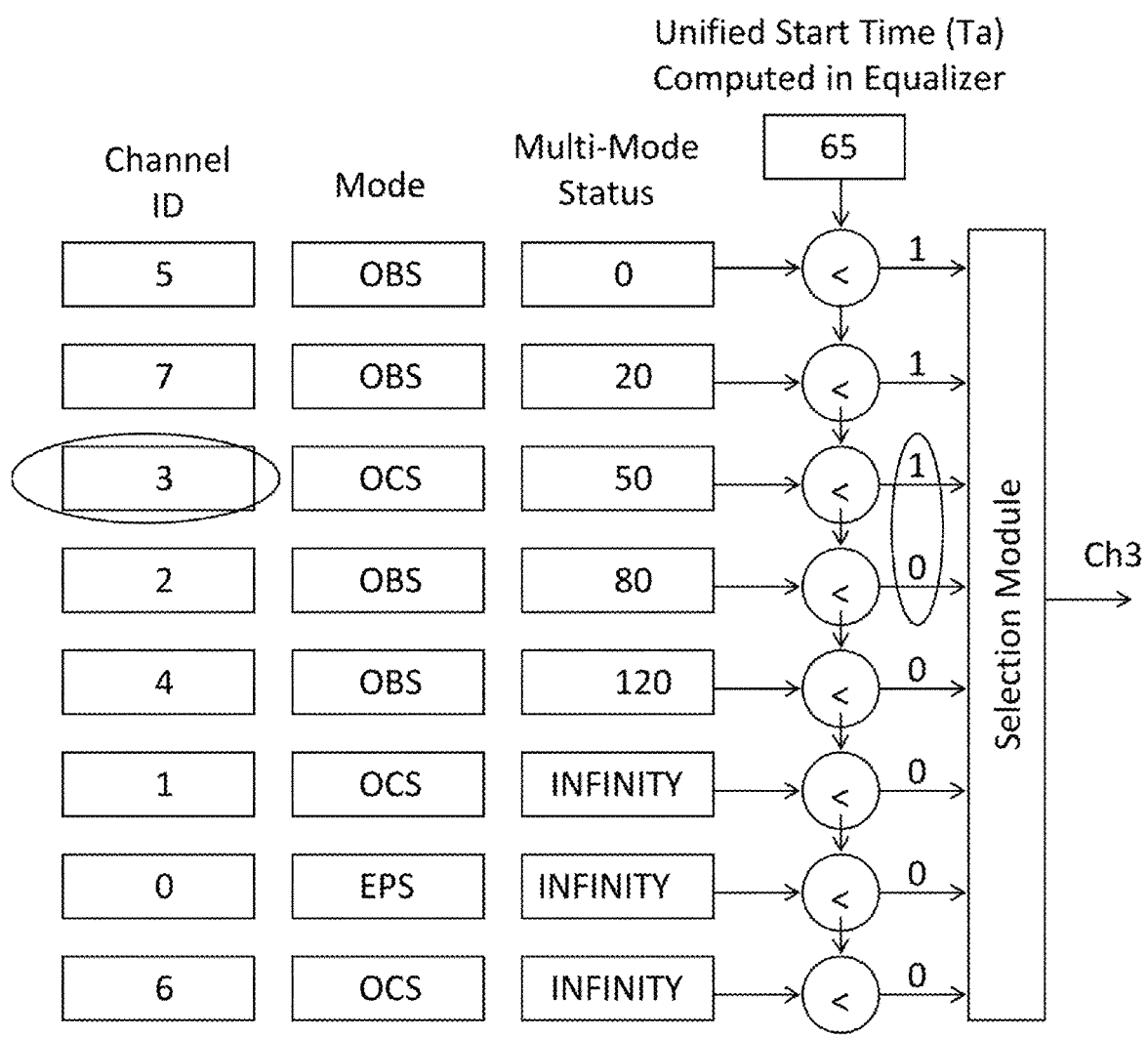
FIG. 14*a*-14*c* are an illustrative implementation of multi-mode channel selection and update.
Figure 14B:
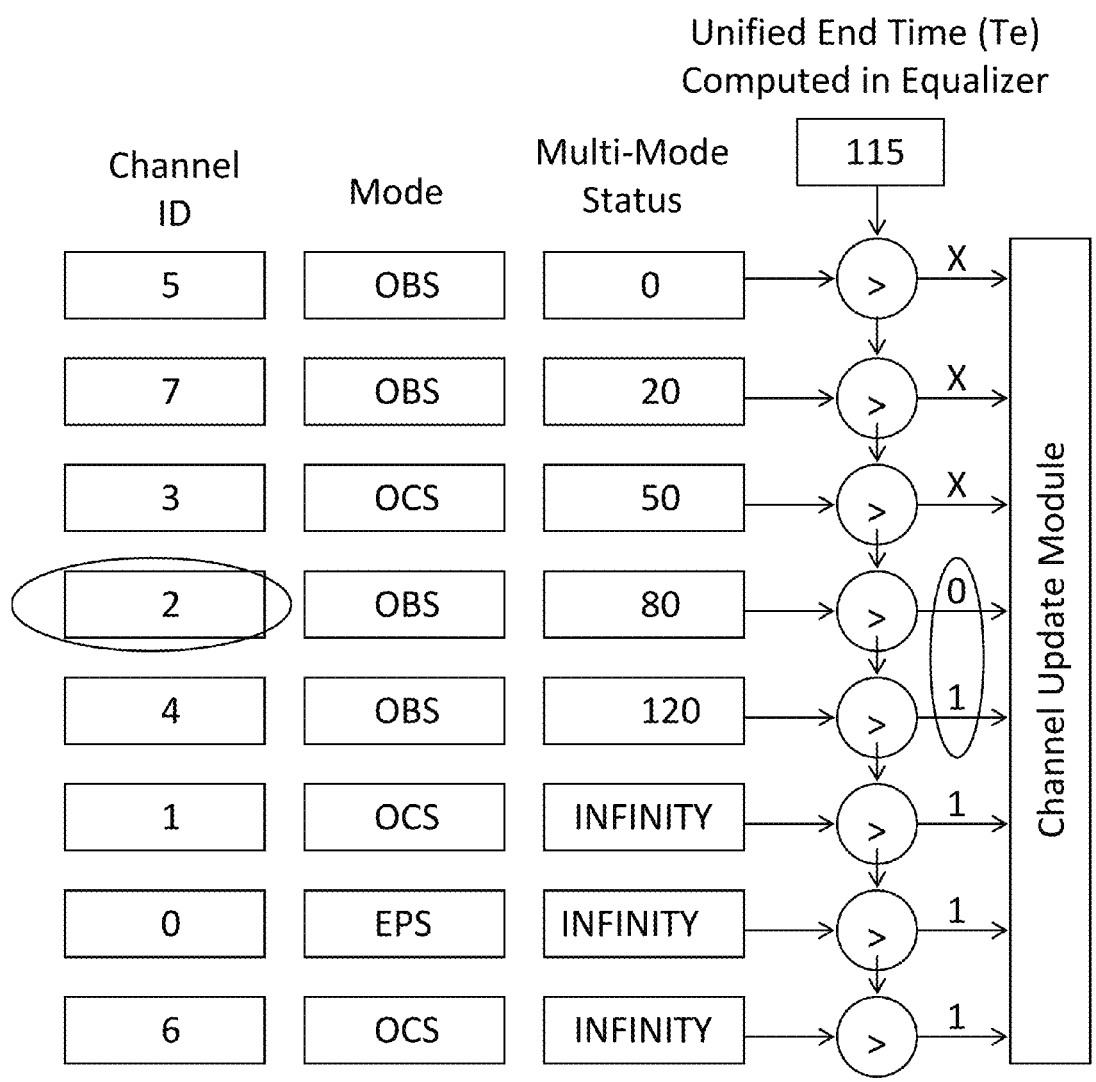
Figure 14C:
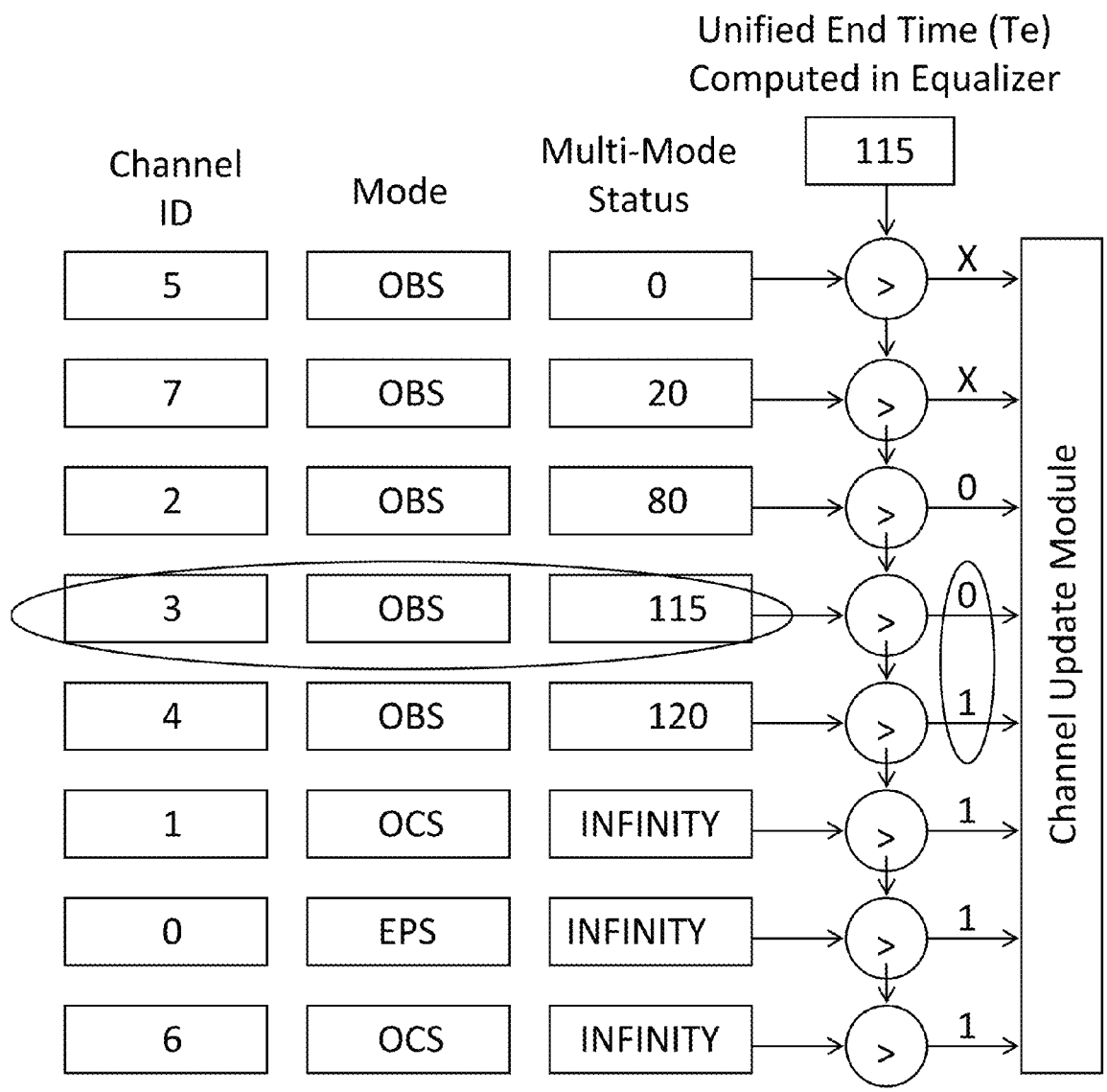

FIG. 14A, FIG. 14B, and FIG. 14C illustrate the unified multi-mode channel selection and channel update. In FIG. 14A, channel status information is maintained in ascending order of the values of multi-mode status. Channel status information may include information such as, but not limited to, channel ID, switching mode, multi-mode status, or the like. To select a channel, the unified connection start time (Ta) computed in the multi-mode parameter equalizer 650 is compared with the values stored in the multi-mode channel status table. If the channel status is less than Ta, a logic "1" is produced. Otherwise, a logic "0" is produced. Since the multi-mode channel status is maintained in ascending order, the results of the comparison will always follow the following pattern: a set of "1s" followed by a set of "0s". Depending on the values of the channel status, one of the sets can be empty. The channel stored at the "1" to "0" transition location is selected by the selection module. In the illustrative example in FIG. 14A, channel 3 is selected. This operation ensures that a best fit channel is selected.

Once a channel is selected to carry the new connection (e.g. OBS, OCS, EPS), its switching mode, and the multi-mode channel status needs to be updated to reflect the newly assigned connection using the unified connection end time (Te) and mode information computed in the multi-mode parameter equalizer 650. In addition, since the multi-mode channel status table needs to be kept in ascending order, the channel with updated channel status value needs to be inserted into a new location to maintain such an ascending order. FIG. 14B illustrates how to identify the location for the channel insertion. To identify the correct location, the end time Te is compared with the multi-mode channel status. If the channel status is greater than the end time Te, a logic "1" is produced. Otherwise, a logic "0" is produced. The channels with status values smaller than the select channel do not need to be compared as their positions will not change, and the results from the comparison are marked as "X" to indicate that the results do not affect the channel update. Since the status table is maintained in ascending order, the results follow the following pattern: a set of "0s" followed by a set of "1s". The "0" to "1" transition location is the location to insert the updated channel status. To make room for the insertion, all channels receiving a "0" shift in the direction of the smaller status values. The updated channel is inserted into the "0" to "1" transition location. The shift and insertion operations are illustrated in FIG. 14C. After the operation, the channel status is updated, and the multi-mode channel status table remains in ascending order. The channel ID and the mode for the channel are moved along with the channel status.

Figure 15A:
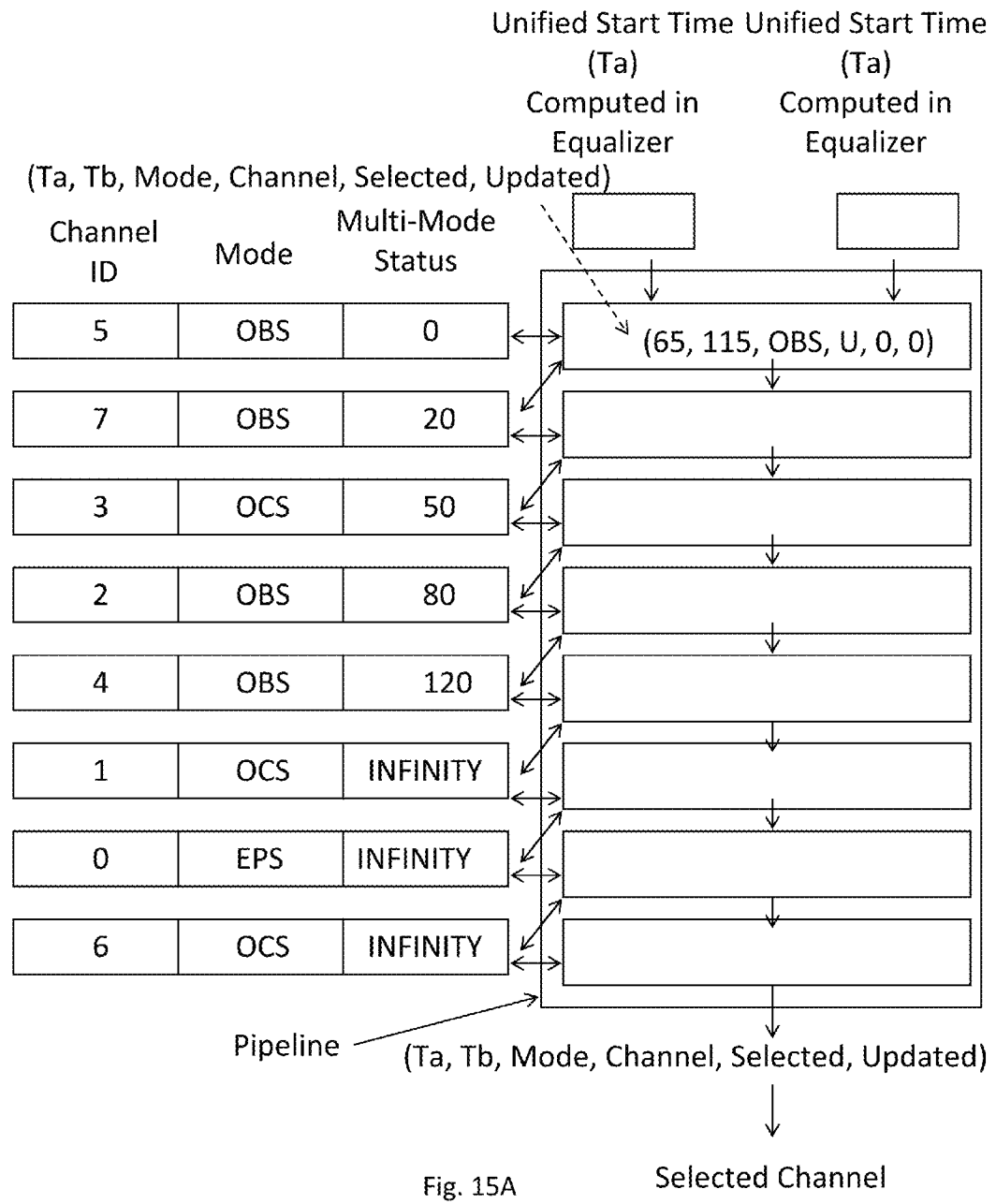
FIG. 15*a*-15*i* are an illustrative pipelined implementation of multi-mode channel selection and update.
Figure 15B:
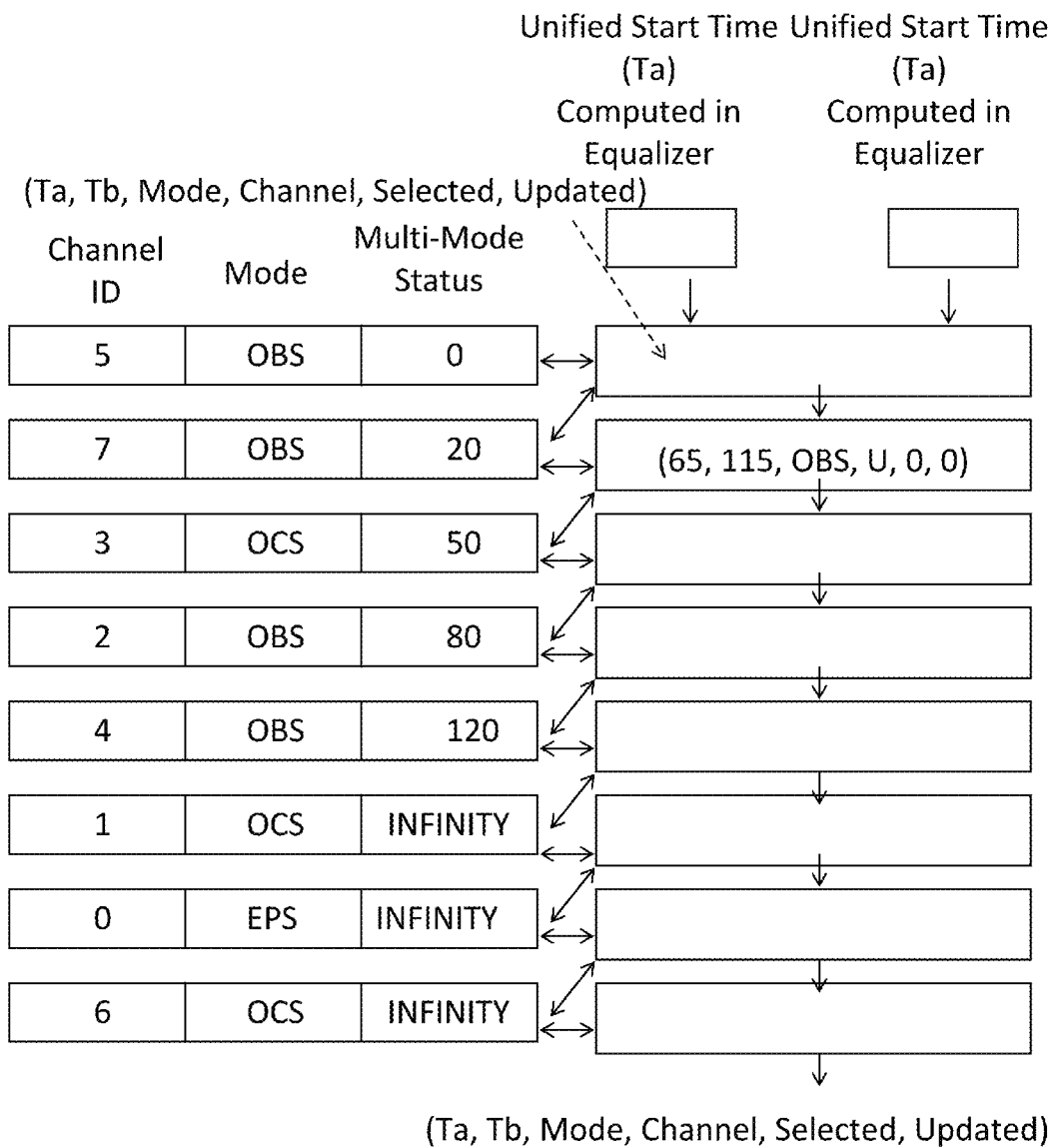
Figure 15C:
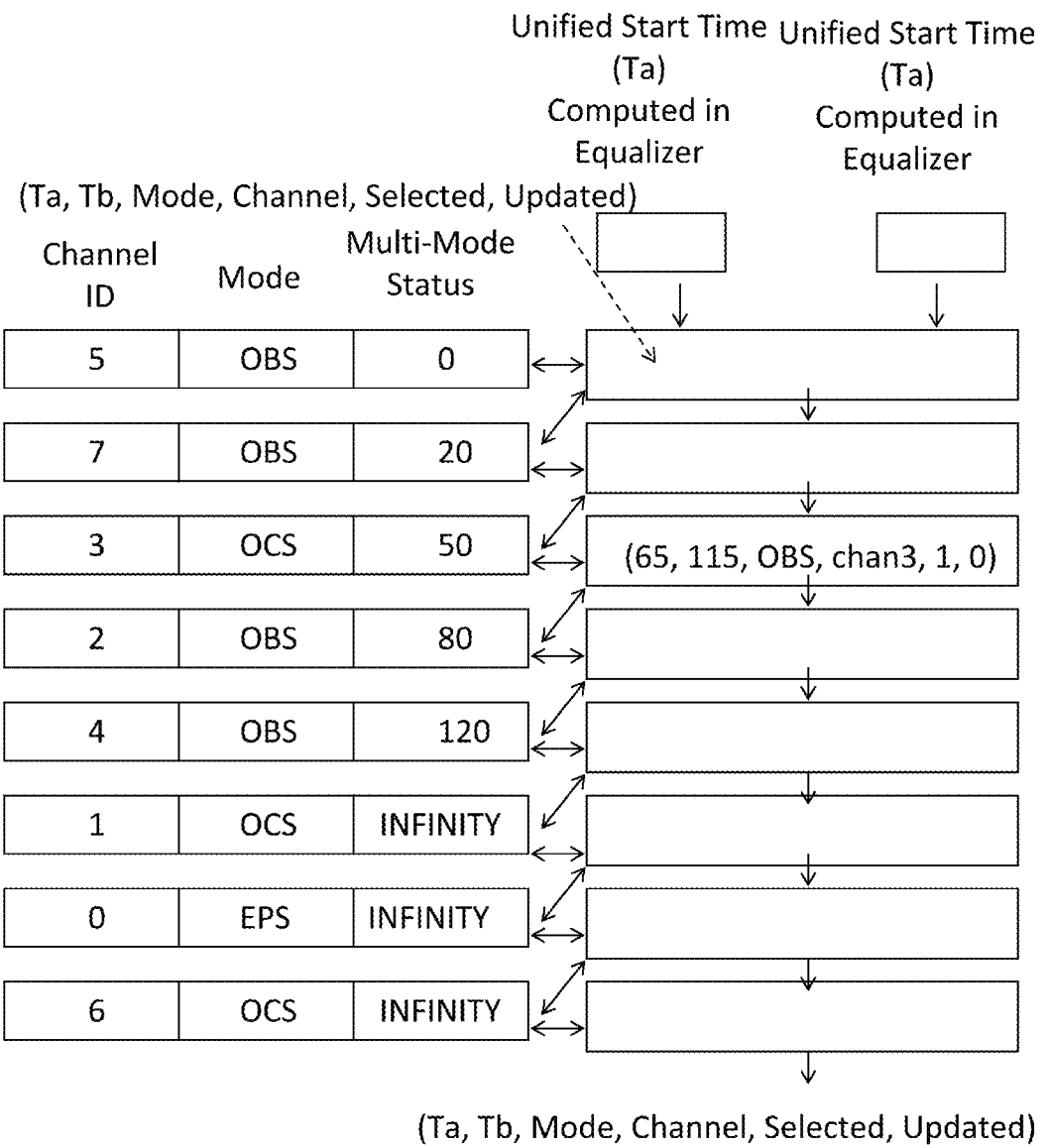
Figure 15D:
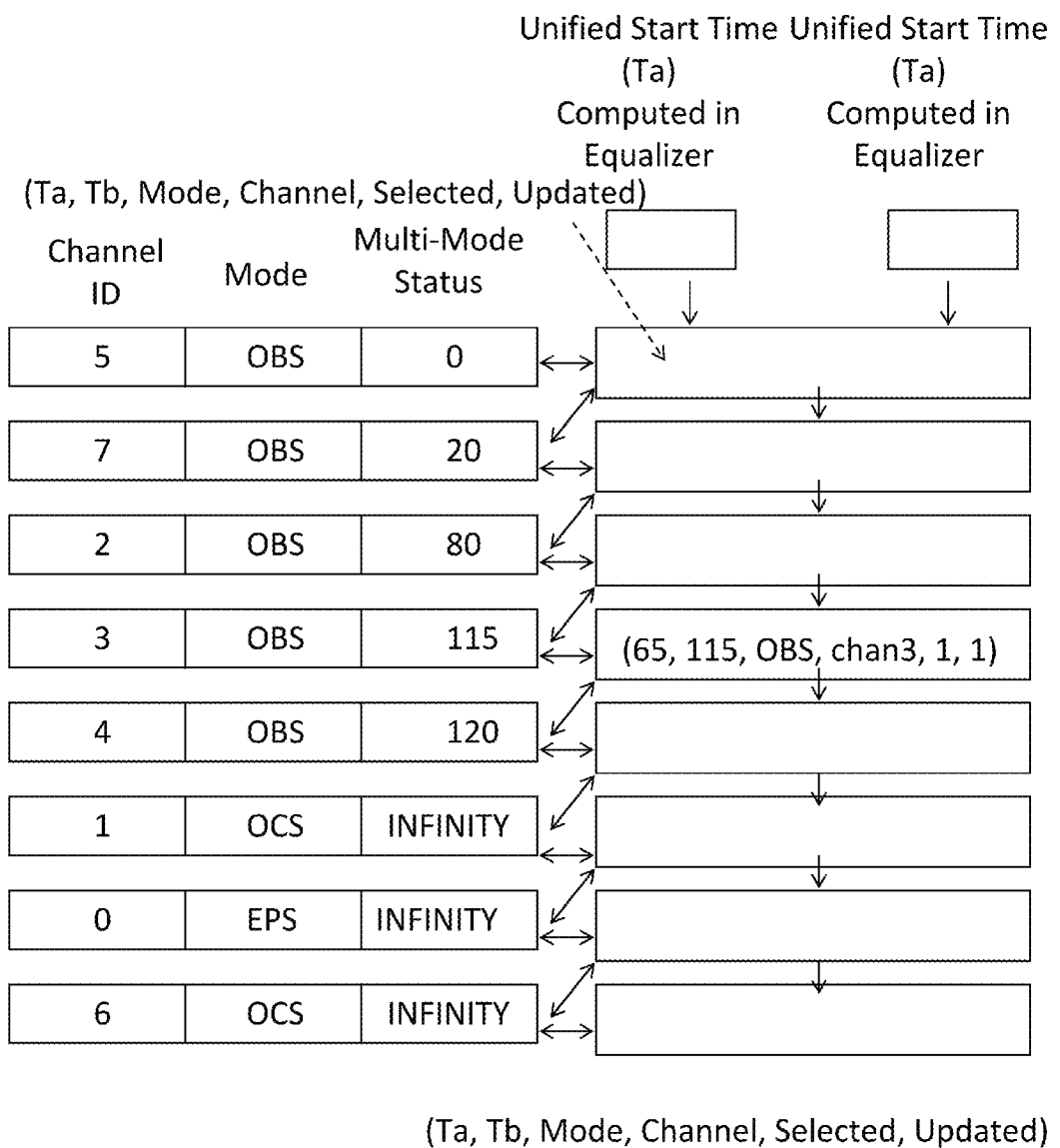
Figure 15E:
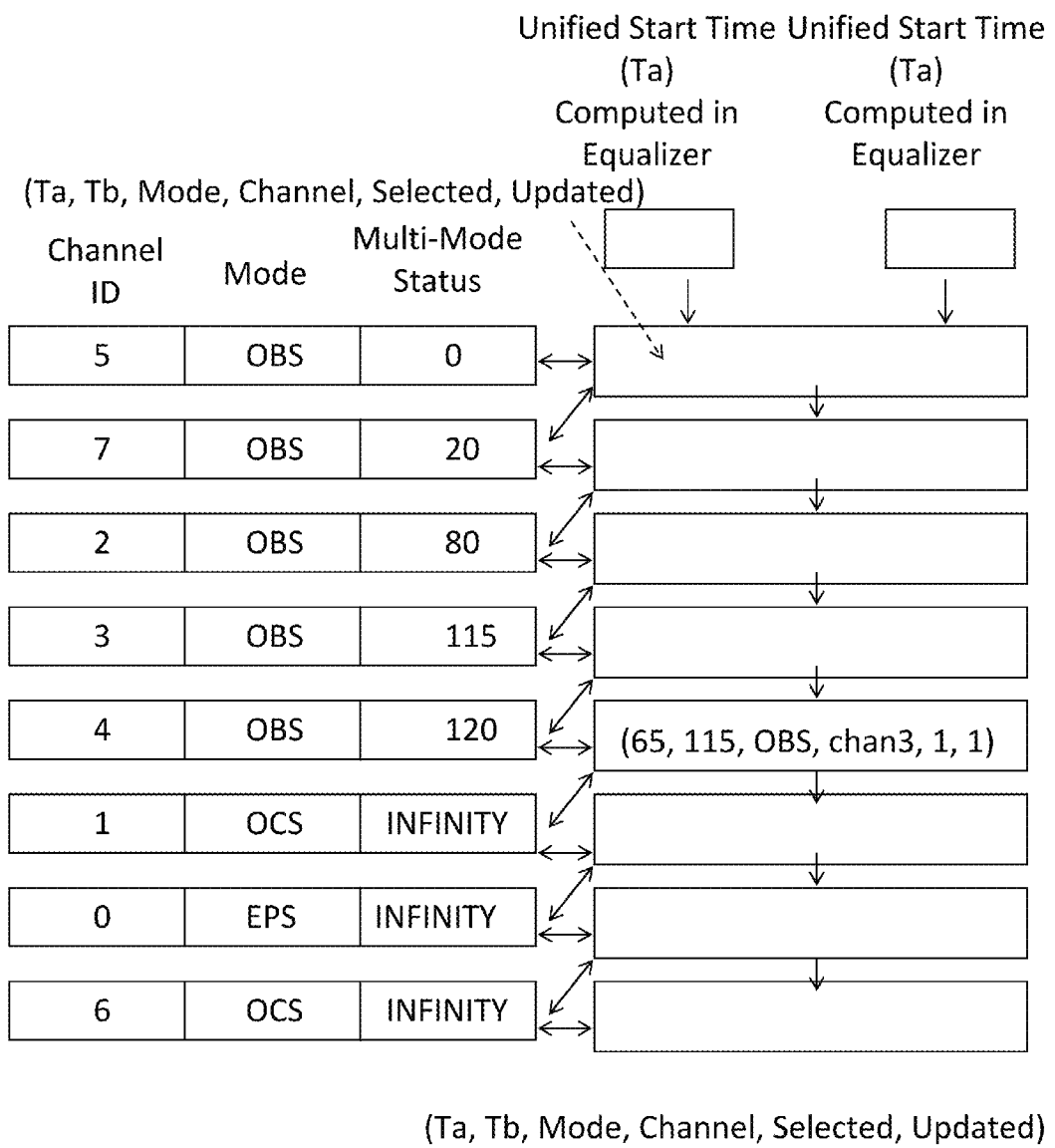
Figure 15F:
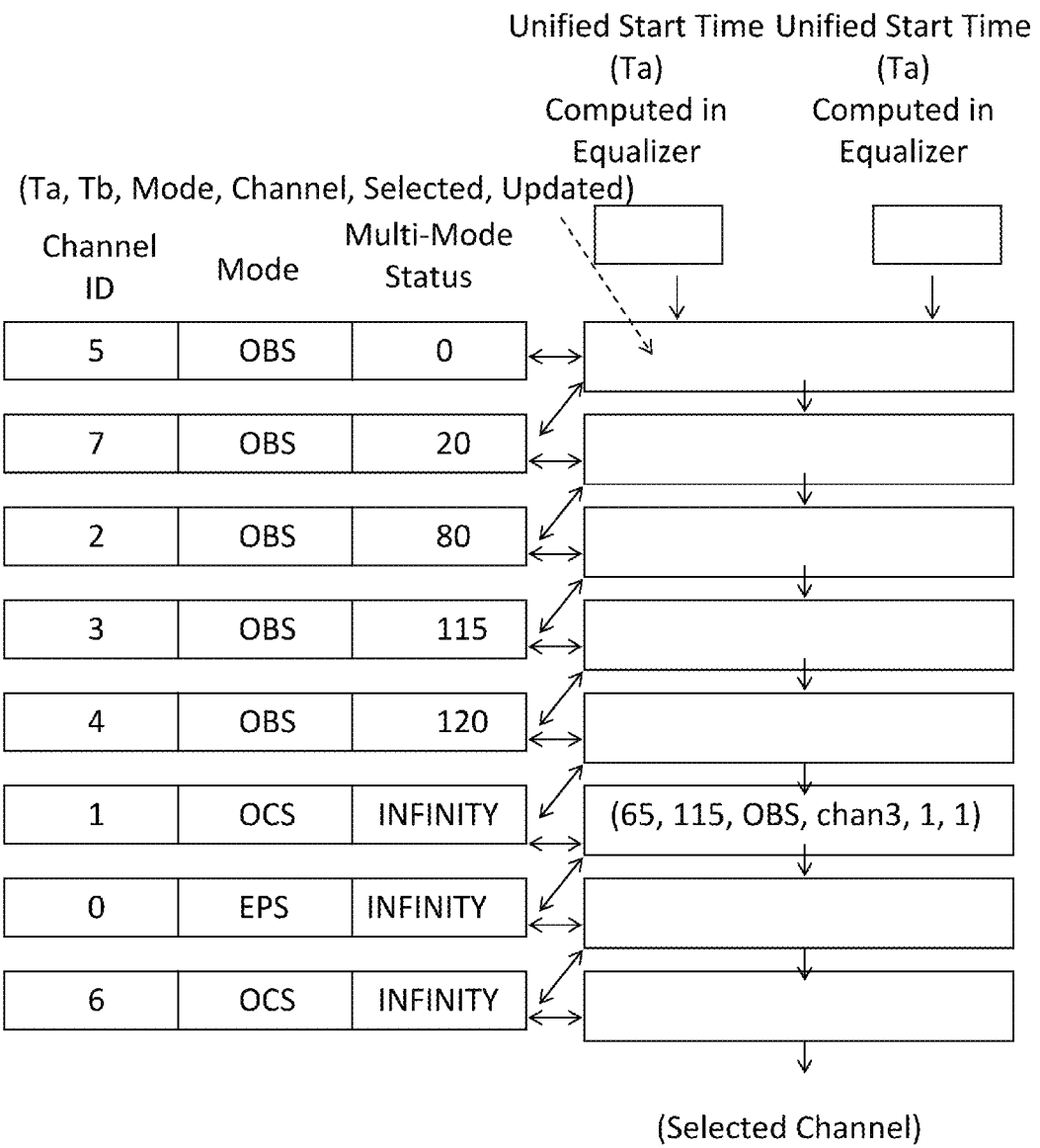
Figure 15G:
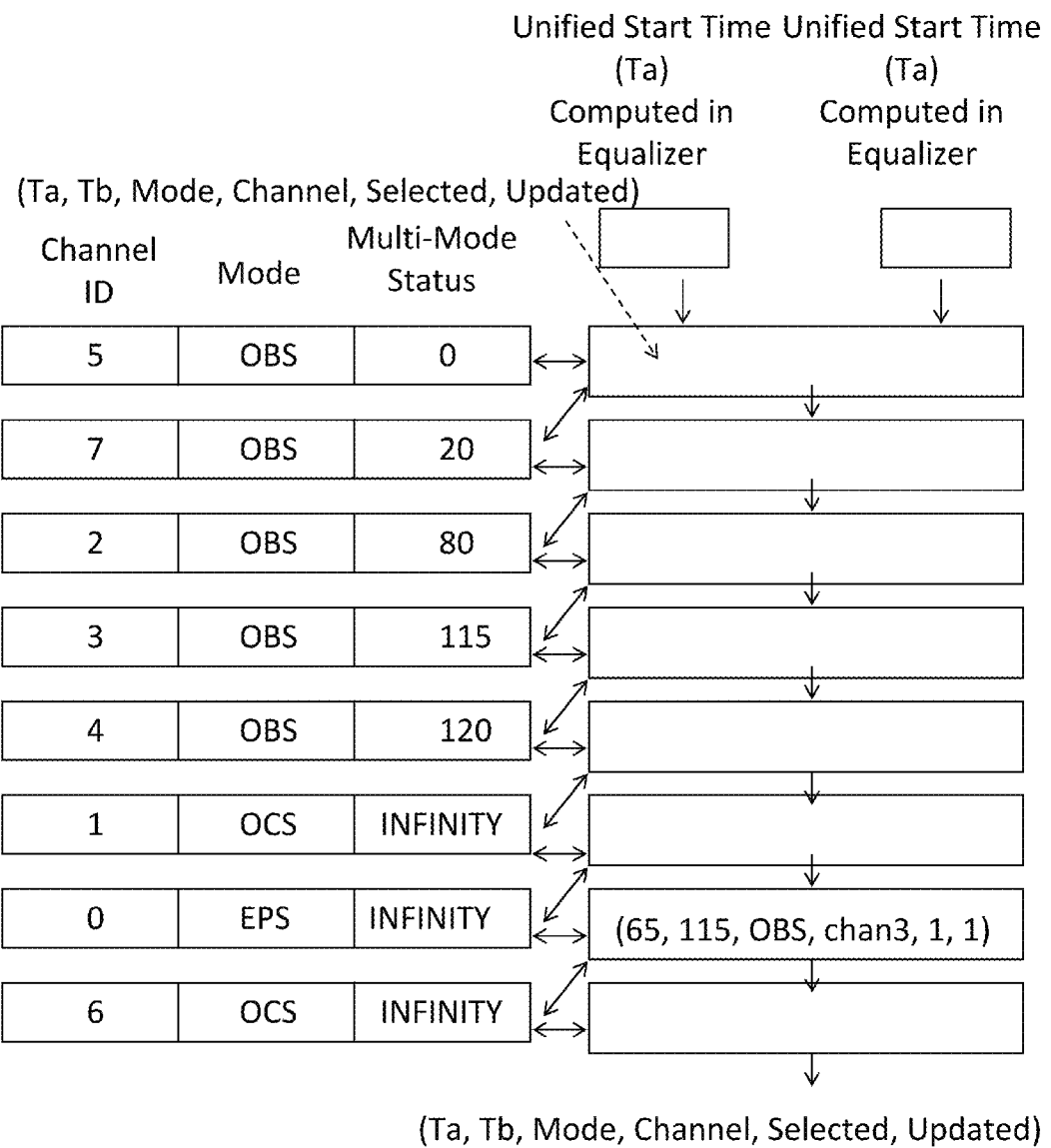
Figure 15H:
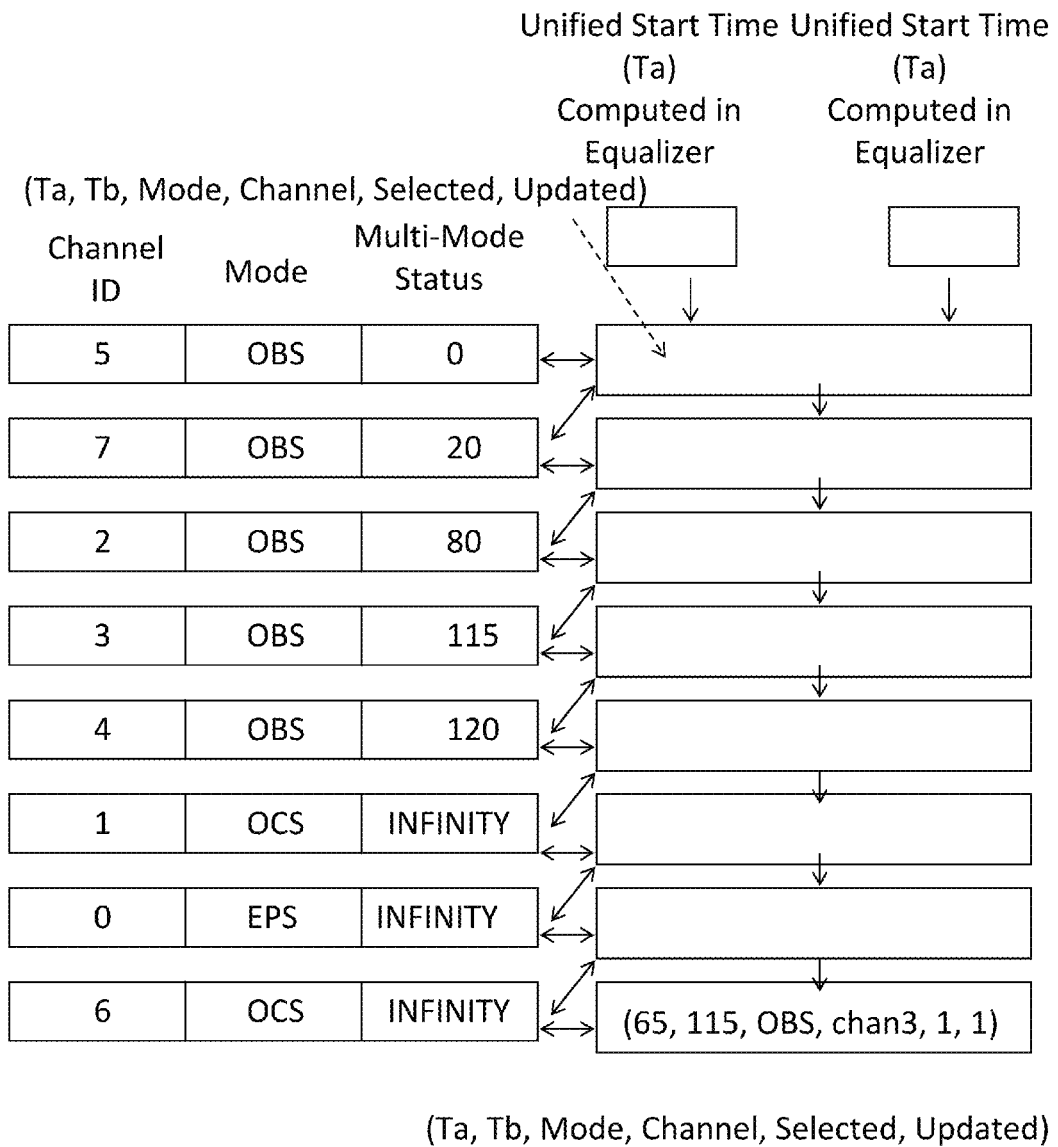
Figure 15I:
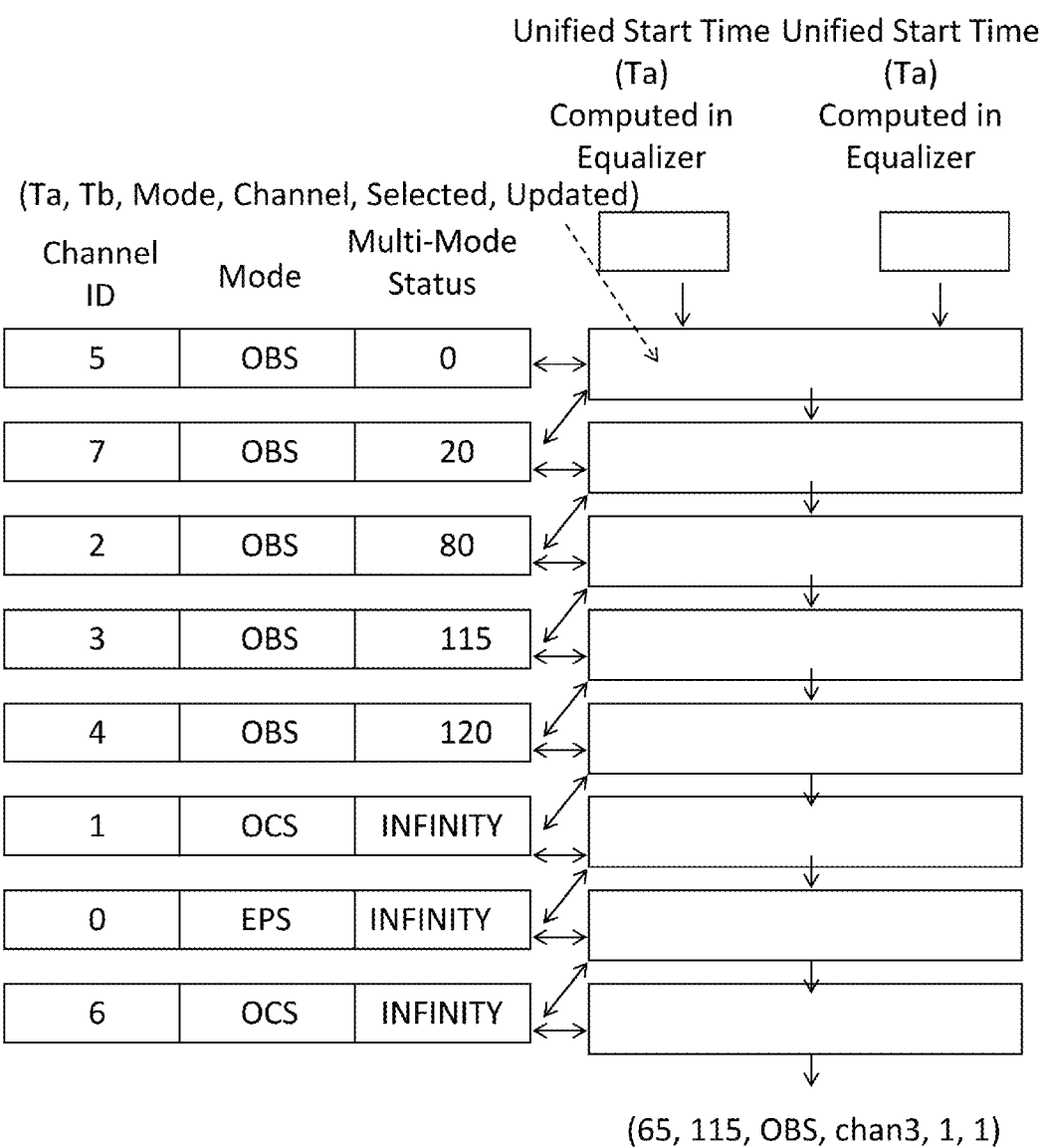

Multi-mode channel selection and update operation can be completed in a pipelined fashion to achieve high-speed operations. FIGS. 15A-15I, illustrate the pipelined structure of the unified multi-mode channel selection and channel update. The pipelined structure allows multiple configuration requests to be processed simultaneously; however, for the purposes of illustration and to prevent confusion, only a single configuration request is illustrated. In FIG. 15A, the channel ID, mode, multi-mode channel status are maintained in ascending order based on the values of the channel status. The unified connection start time (Ta), end time (Tb), and mode produced by the multi-mode configuration equalizer 650 are the inputs to the pipeline. The pipeline is structured to have the number of stages equal to the number of channels to schedule. Each stage of the pipeline has data storage for (start time, end time, mode, selected channel, selection indicator, update indicator). The selected channel field is initially set to "U" (undefined) before sending the request to the pipeline since a channel has not been selected. However, once a channel is identified, the channel field will be updated with the selected channel ID. The selection indicator is provided to indicate whether a channel selection has been made. The selection indicator is initially set to logic "0" to indicate that a channel has not been selected (e.g. FIG. 15A), but the selection indicator is set to logic "1" once a channel is identified (e.g. FIG. 15C). The update indicator is provided to indicate whether channel status information has been updated. Initially, the update indicator is set to logic "0" to indicate that channel status information has not been updated (e.g. FIG. 15A). Once the selected channel is inserted into the new location to maintain an ascending order, the update indicator is set to logic "1" (e.g. FIG. 15D, where channel ID 3 has been updated). At this point, the request simply shifts through the remaining stages (e.g. FIGS. 15E-H) until it reaches the output stage, where the selection indicator is checked. If the selection indicator remains "0" at the output stage, it means that no channel is found because all channels are busy at the connection start time. In this case, the connection is rejected and further scheduling attempt(s) are necessary to allocate a channel. Otherwise, the selected channel is recorded, and the information corresponding to the channel is used to set up the optical path. FIGS. 15A-15I illustrates an example of processing one request, with channel selection and update completed while the request passes through different stages in the pipeline. In the example, channel 3 is selected since Ta to multi-mode status comparison transitions as shown in FIG. 14A. As the request passes through the pipeline stages, the multi-mode channel status is updated and remains in ascending order. For example, as shown in FIG. 15D, the channel information correspond to channel ID 3 has been updated and the channel information has been resorted according to ascending multi-mode status. The channel selection results can be obtained at the output stage as illustrated in FIG. 15I.

Simulation and Hardware Experimental Results

The performance of the integrated DWDM multi-mode scheduling scheme discussed herein was evaluated using software simulation, as well as hardware experiments in an optical switching testbed. More specifically, an extended version of the OBS-ns simulator for simulation was used, and optical switching nodes along with Field Programmable Gate Array (FPGA) development boards for hardware experiments were used.

Software Simulation: The traditional LAUC-VF scheduling and the integrated DWDM multi-mode scheduling using a 14-node, 21-link NSFNET topology were both simulated.

Figure 16:
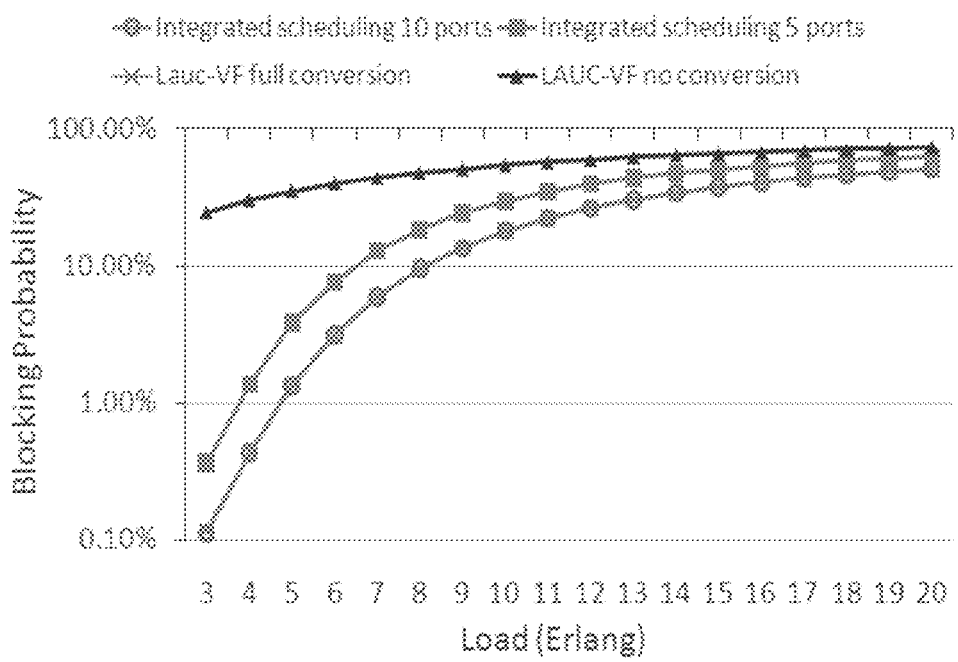
FIG. 16 is an illustrative implementation of blocking analysis for integrated scheduling under burst traffic.

Each DWDM link carries 8 data channels and 2 control channels in each direction. FIG. 16 plots the burst blocking probabilities at different load conditions for LAUC-VF with full wavelength conversion capability, LAUC-VF with no wavelength conversion capability in traditional OBS core networks, and integrated scheduling in RA-OBS networks. It shows that although RA-OBS does not have full wavelength conversion capability, the integrated scheduling scheme delivers blocking performance close to full conversion LAUC-VF for relatively large number of electronic ports. This is because integrated scheduling can efficiently utilize the pool of E/O and O/E converters shared by multi-mode traffic.

Figure 17:
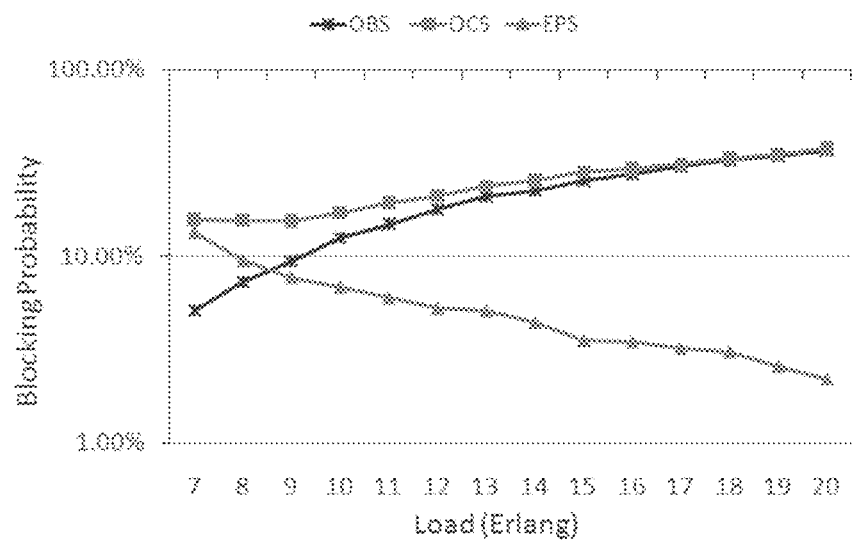
FIG. 17 is an illustrative implementation of blocking analysis for integrated scheduling under multi-mode traffic.

In FIG. 17, the block probabilities obtained by integrated scheduler are shown when all three modes of traffic co-exist in the network. The load of OBS traffic was kept at 5 Erlang, while increasing the total traffic offered by EPS and OCS connections. The average duration of an EPS or OCS connection is assumed to be 100 times that of the average burst length. EPS and OCS connections are generated according to Poisson process. As the ESP and OCS traffic load increases, OBS burst blocking increases as expected. The OCS connection follows similar trend. Note that EPS connection blocking is reduced as we equally increase both EPS and OCS injection rates. This is because EPS connections can share common paths previously set up in the network as opposed to the exclusive wavelength occupation of OCS connections. More common paths are possible when there are more existing EPS connections.

Figure 18:
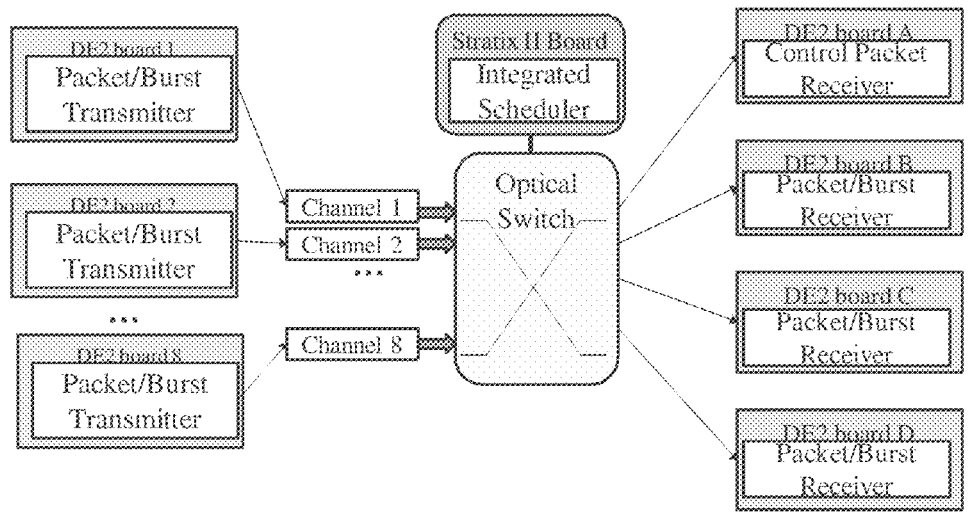
FIG. 18 is an illustrative implementation of a hardware testbed.

Hardware Implementation and Testbed Experiments: In addition to software simulation, the effectiveness of the integrated multi-mode scheduling scheme, and its speed and cost effectiveness in hardware implementation was verified in a hardware testbed illustrated in FIG. 18. The algorithm was implemented in FPGA hardware using Hardware Description Language Verilog HDL. The FPGA hardware was used along with the optical switching node in the optical switching testbed.

Figure 19:
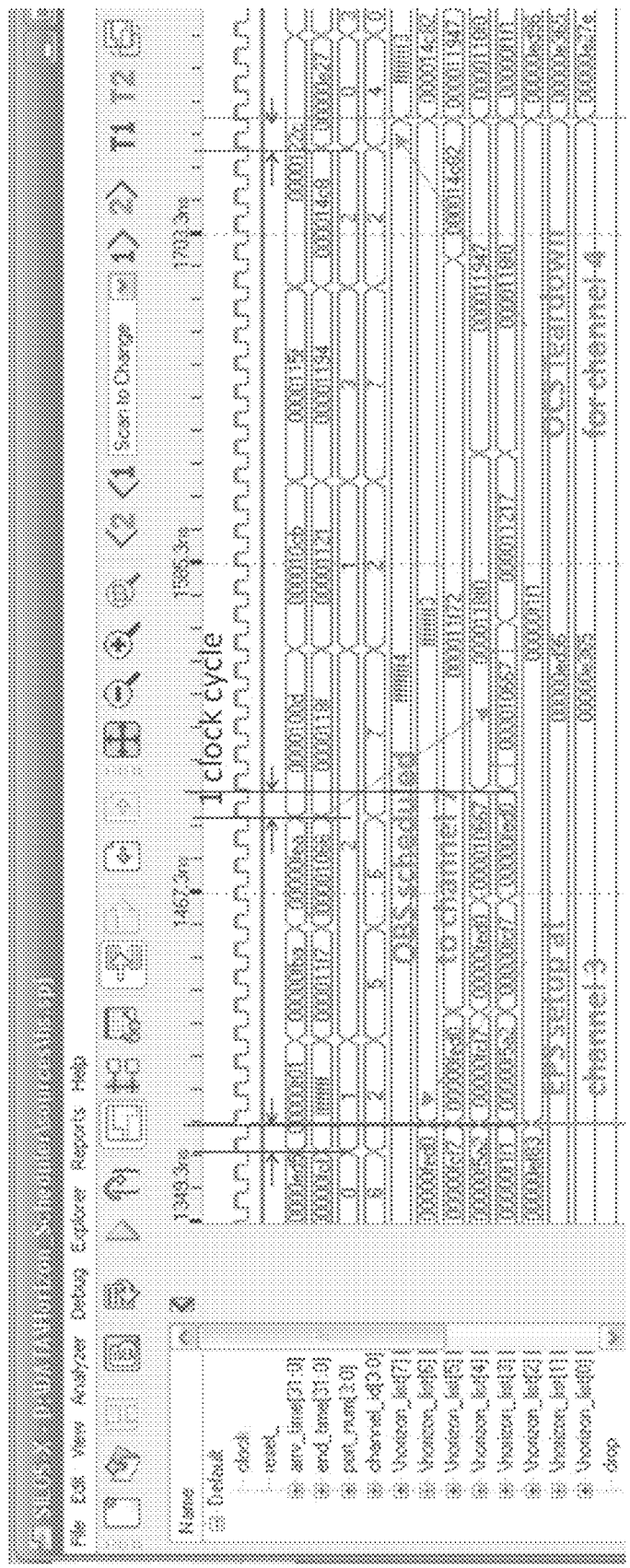
FIG. 19 is an illustrative implementation of a SILOS simulation for EPS connection setup, OCS connection teardown and OBS burst scheduling.

More specifically, the ingress packet/burst transmitters supporting 8 transmission channels were implemented using 8 Altera DE2 FPGA boards. The proposed integrated multi-mode scheduling algorithm was implemented on the Terasic Stratix II FPGA development board. The packet/burst receiver functions were implemented on 4 Altera DE2 FPGA boards. To verify the effectiveness in handling multi-mode switching connections, several traffic patterns were generated to the integrated multi-mode scheduler module. FIG. 19 shows the results of the hardware circuit simulation of the concurrent operations of EPS setup, OCS teardown and OBS burst scheduling. The hardware module was implemented using Verilog-HDL and the circuit was simulated using Silos Verilog simulator. Each configuration scheduling request can be completed with a fixed number of clock cycles (O(1) runtime). In a pipelined implementation, the request can be completed in one clock cycle, independent of the total number of channels (8 in this example).

The multi-mode scheduling scheme for the RA-OBS multi-mode switching network can provide burst scheduling in the OBS mode, connection setup/teardown in the OCS mode, as well as channel reconfiguration in the EPS mode in an integrated fashion. The performance of the integrated multi-mode scheduler 1100 has been verified using OBS-ns2 simulator as well as in a hardware testbed, and the algorithm is suitable for high speed hardware implementation with O(1) runtime complexity.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A method for managing switching configurations for a multi-mode switching router, the method comprising:
   receiving configuration information at said multi-mode switching router in an electronic packet switching (EPS), optical burst switching (OBS), or optical circuit switching (OCS) mode format;
   determining a switching mode from said configuration information,
      wherein if the switching mode is an OBS or OCS mode, selecting an available outgoing optical wavelength according to an incoming optical wavelength, and
      if the switching mode is an EPS mode, selecting an available outgoing optical wavelength; and
   converting said configuration information into unified parameters that are mode independent.

2. The method of claim 1, if the switching mode is said EPS mode the method further comprises,
   selecting an available electronic input port, wherein EPS mode data is routed to said available electronic input port by an optical switching fabric; and
   selecting an available electronic output port, wherein said EPS mode data is routed to said available electronic output port by an electronic switching fabric.

3. The method of claim 2, further comprising configuring said electronic switch fabric in accordance with said available electronic input port and said available electronic output ports selected for said EPS mode data.

4. The method of claim 1, further comprising configuring an optical switching fabric in accordance said available outgoing optical wavelength selected for said EPS mode.

5. The method of claim 1, wherein if said outgoing optical wavelength and said incoming optical wavelength for said OBS or OCS mode are the same, configuring an optical switching fabric to route data from said incoming optical wavelength to an available output.

6. The method of claim 1, wherein if said outgoing optical wavelength and said incoming optical wavelength for said OBS or OCS mode are different, converting said incoming optical wavelength to said available outgoing optical wavelength for said OBS mode or said OCS mode.

7. The method of claim 6, further comprising:
   selecting an available electronic input port, wherein OBS or OCS mode data is routed to said available electronic input port by an optical switching fabric; and
   selecting an available electronic output port, wherein said OBS or OCS mode data is routed to said available electronic output port by an electronic switching fabric.

8. The method of claim 7, further comprising configuring said electronic switch fabric in accordance with said available electronic input port and said available electronic output ports selected for said OBS or OCS mode data.

9. The method of claim 6, further comprising configuring said optical switching fabric in accordance with said available outgoing optical wavelength selected for said OBS mode or said OCS mode.

10. The method of claim 1, further comprising allocating a first channel for the OCS mode or EPS mode for an infinite amount of time.

11. The method of claim 10, wherein a status of the first channel allocated for the OCS or EPS mode is updated when a teardown request is received.

12. The method of claim 1, further comprising allocating a second channel for an OBS mode, wherein the second channel is allocated for a burst duration starting from a burst arrival time.

13. The method of claim 1, further comprising determining a start time and end time from the unified parameters, wherein an allocated channel is determined in accordance with the start time.

14. The method of claim 13, wherein channel status information of the allocated channel is updated with information from the unified parameters.

15. A multi-mode configuration module for managing switching for an electronic packet switching (EPS), optical burst switching (OBS), or optical circuit switching (OCS) mode, the multi-mode configuration module comprising:
 a multi-mode configuration processor, wherein said multi-mode configuration processor receives configuration information for an EPS, OCS, or OBS mode;
 an optical configuration processor coupled to said multi-mode configuration processor, wherein said optical configuration processor manages wavelength routing of an optical switching fabric;
 an electronic configuration processor coupled to said multi-mode configuration processor, wherein said electronic configuration processor manages routing of an electronic switching fabric; and
 an optical wavelength status unit coupled to said optical configuration processor, wherein said optical wavelength status unit maintains status information for outgoing wavelengths of said optical switching fabric.

16. The module of claim 15, further comprising:
 an electronic input port status unit coupled to said electronic configuration processor, wherein said electronic input port status unit maintains status information for input ports of said electronic switching fabric; and
 an electronic output port status unit coupled to said electronic configuration processor, wherein said electronic output port status unit maintains status information for output ports of said electronic switching fabric.

17. The module of claim 15, wherein the multi-mode configuration packet processor comprises:
 a configuration extractor for extracting said configuration information from a configuration packet;
 a parameter equalizer coupled to said configuration extractor, wherein said parameter equalizer converts said configuration information into unified parameters that are mode independent; and
 a configuration sequencer coupled to said parameter equalizer, wherein said configuration sequencer sequences manages configuration operations of said electronic configuration processor and said optical configuration processor.

18. The module of claim 17, further comprising allocating a first channel for the OCS mode or EPS mode for an infinite amount of time.

19. The module of claim 18, wherein a status of the first channel allocated for the OCS or EPS mode is updated when a teardown request is received.

20. The module of claim 17, further comprising allocating a second channel for an OBS mode, wherein the second channel is allocated for a burst duration starting from a burst arrival time.

21. The module of claim 17, further comprising determining a start time and end time from the unified parameters, wherein an allocated channel is determined in accordance with the start time.

22. The module of claim 21, wherein channel status information of the allocated channel is updated with information from the unified parameters.

* * * * *